US012645821B2

(12) United States Patent
Khare et al.

(10) Patent No.: US 12,645,821 B2
(45) Date of Patent: Jun. 2, 2026

(54) EVENT INTEGRATED ACCESS GRAPH DATA MANAGEMENT

(71) Applicant: Oleria Corporation, Seattle, WA (US)

(72) Inventors: Adarsh Khare, Sammamish, WA (US); James Alkove, Seattle, WA (US); Siva Garudayagari, Sammamish, WA (US); Jagadeesh Kunda, Southlake, TX (US)

(73) Assignee: Oleria Corporation, Seattle, WA (US)

( * ) Notice: Subject to any disclaimer, the term of this patent is extended or adjusted under 35 U.S.C. 154(b) by 155 days.

(21) Appl. No.: 18/592,051

(22) Filed: Feb. 29, 2024

(65) Prior Publication Data

US 2025/0225264 A1 Jul. 10, 2025

Related U.S. Application Data

(60) Provisional application No. 63/618,961, filed on Jan. 9, 2024.

(51) Int. Cl.
 G06F 21/62 (2013.01)
 G06F 16/901 (2019.01)

(52) U.S. Cl.
 CPC ...... G06F 21/6218 (2013.01); G06F 16/9024 (2019.01)

(58) Field of Classification Search
 CPC .......................... G06F 21/6218; G06F 16/9024
 See application file for complete search history.

(56) References Cited

U.S. PATENT DOCUMENTS

| | | | | |
|---|---|---|---|---|
| 9,900,305 | B2 * | 2/2018 | Levergood | ............. G06Q 30/06 |
| 11,108,828 | B1 | 8/2021 | Curtis et al. | |

| | | | | |
|---|---|---|---|---|
| 2017/0177744 | A1 | 6/2017 | Potiagalov et al. | |
| 2020/0045049 | A1 * | 2/2020 | Apostolopoulos | ....... G06N 7/00 |
| 2020/0184087 | A1 | 6/2020 | Nos et al. | |
| 2021/0243190 | A1 | 8/2021 | Bargury et al. | |
| 2025/0173652 | A1 * | 5/2025 | Rashkevitch | ....... G06F 21/6218 |
| 2025/0173654 | A1 * | 5/2025 | Badichi | ................. G06F 40/186 |

FOREIGN PATENT DOCUMENTS

WO WO 2023/129786 A1 7/2023

OTHER PUBLICATIONS

PCT International Search Report and Written Opinion, PCT Application No. PCT/US2025/010498, Apr. 29, 2025, nine pages.

\* cited by examiner

*Primary Examiner* — Kristie D Shingles
(74) *Attorney, Agent, or Firm* — Fenwick & West LLP

(57) ABSTRACT

A data management system may include data connectors configured to establish connections with access control systems and receive heterogeneous metadata related to the data access history. The system may include a transformer that stores graph objects in memory. The graph objects may include application account nodes representing application accounts associated with the domain and resource nodes representing data resources associated with the domain. The system may further store event objects. The system may render for display a data access graph that illustrates a data permission traversal path from a source node to a particular data resource. The data permission traversal path may include a graphical representation representing the particular application account having permission to access the particular data resource. At least a portion of the graphical representation may be rendered according to the data access activity level of the particular application account accessing the particular data resource.

18 Claims, 12 Drawing Sheets

100

1100

EVENT INTEGRATED ACCESS GRAPH DATA MANAGEMENT

CROSS-REFERENCE TO RELATED APPLICATION

The application claims benefit to U.S. Provisional Application No. 63/618,961, filed on Jan. 9, 2024, which is incorporated by reference herein for all purposes.

TECHNICAL FIELD

The instant disclosure is related to data management of workspace data sources and computer architecture in data management.

BACKGROUND

In contemporary large enterprises, efficient data management stands as a cornerstone of operational success. The proliferation of digital assets, ranging from sensitive corporate information to customer data, requires robust systems to ensure secure access, integrity, and compliance. However, as enterprises expand in scale and complexity, the challenge of comprehensively understanding and managing access rights for individual users can often emerge as a bottleneck.

The exponential growth of data within large enterprises introduces a myriad of complexities, such as user access rights. In a typical organizational ecosystem, users span various roles, departments, and hierarchical levels, each with distinct privileges and requirements for accessing data. Traditional methods of managing access rights, such as role-based access control, often fall short of adequately addressing the nuanced needs of modern enterprises.

Furthermore, the dynamic nature of organizational structures and evolving regulatory landscapes exacerbate the challenge of maintaining granular control over data access. As employees transition between roles and projects, or leave the organization, ensuring timely adjustments to access permissions becomes a daunting task. This fluidity introduces inherent vulnerabilities, leaving sensitive data susceptible to unauthorized access or inadvertent exposure.

Compounding this complexity are the diverse data sources and repositories scattered across heterogeneous information technology (IT) environments. From on-premises servers to cloud-based platforms, data may reside in different sources. An organization often needs to reconcile the dynamic interplay between user access rights, data repositories, and evolving organizational structures.

The figures depict, and the detailed description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
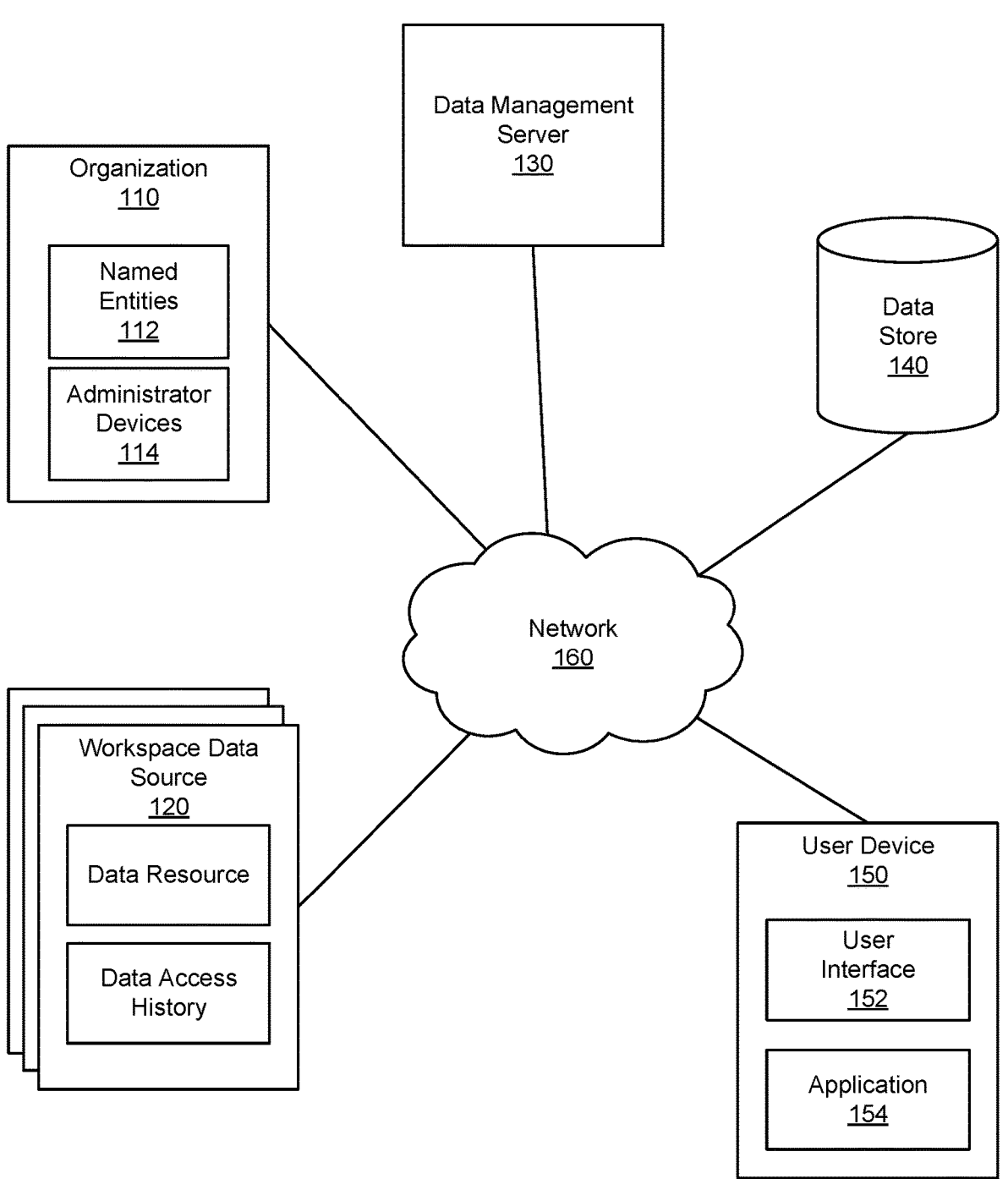
FIG. 1 is a block diagram of a system environment, in accordance with some embodiments.

FIG. (FIG. 1 is a block diagram that illustrates an example of a system environment 100 for managing data access, in accordance with some embodiments. By way of example, the system environment 100 includes an organization 110, workspace data sources 120, a data management server 130, a data store 140, and a user device 150. The entities and components in the system environment 100 communicate with each other through network 160. In various embodiments, the system environment 100 may include different, fewer, or additional components.

The components in the execution environment 100 may each correspond to a separate and independent entity or may be controlled by the same entity. For example, in some embodiments, the data management server 130 may control the data store 140. In other embodiments, the data management server 130 and the data store 140 are operated by different entities and the data store 140 provides data storage service to the data management server 130. Likewise, in some embodiments, an organization 110 may control one or more workspace data sources 120, such as in situations where the organization 110 manages part of its own data.

While each of the components in the system environment 100 is sometimes described in disclosure in a singular form, the system environment 100 may include one or more of each of the components. For example, there can be multiple user devices 150 communicating with the data management server 130 and workspace data sources 120. The data management server 130 may provide data access manage- ment services to different unrelated organizations 110, each of which has multiple workspace data sources 120. While a component is described in a singular form in this disclosure, it should be understood that in various embodiments, the component may have multiple instances. Likewise, while some of the components are described in a plural form, in some embodiments the component only has a single instance in the system environment 100. For example, in some situations, an organization 110 may use a single workspace data source 120.

An organization 110 may be any suitable entity such as a government entity, a private business, a profit organization or a non-profit organization. An organization 110 may define an application environment in which a group of individuals, devices, and other agents organize and perform activities and exchange information. The system environment 100 may include multiple organizations 110, which may be customers of the data management server 130 that provide various data management-related services to customers, such as data access management, data policy enforcement, etc. An organization 110 may be referred to as a business, a domain, or an application environment, depending on the situation.

By way of example, an organization 110 may also be referred to as a domain. In some embodiments, the terms domain and organization may be used interchangeably. A domain refers to an environment for a group of units and individuals to operate and use domain knowledge to orga- nize activities, enforce policies, and operate in a specific way. An example of a domain is an organization, such as a business, an institute, or a subpart thereof, and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of a business. For example, a domain may be a subsidiary of a company. Various divisions or departments of the organiza- tion may have their own definitions, internal procedures, tasks, and entities. In other situations, multiple businesses may share the same domain. In some embodiments, a domain may also be referred to as a workspace. For example, a business may divide its company into multiple workspaces based on geographical regions, for example, North America, Asia Pacific, Europe, the Middle East and North Africa, Australia and New Zealand, etc. Each work- space may be referred to as a domain.

In some embodiments, an organization 110 may have various types of resources that are under its control. The resources may be directly controlled by the organization 110 within its physical or digital domain or indirectly managed by the organization 110 through one or more workspace data sources 120. Examples of resources may include named entities 112 and administrator devices 114. A named entity 112 may each have one or more accounts that are managed and/or controlled by the organization 110. For example, each employee of an organization 110 may have one or more organizational accounts that have different access rights to various types of data. Sometimes a group of employees (e.g., the legal team, the sales team, the human resource team, etc.) may also be a named entity that has accounts at the group level. The employees and the organizational accounts are both examples of resources that are controlled by the orga- nization 110. A named entity may also correspond to a non-human account (a service account, a machine account, etc.).

Other examples of resources may be data resources, such as datasets that belong to the organization 110. Data can be related to any aspect of the organization 110. In some situations, the organization 110 may directly control the data resources such as having organization-controlled data serv- ers that store the data resources. In other situations, organi- zation 110 may use one or more third-party software plat- forms such as software-as-a-service (SaaS) platforms that provide services to the organization 110. Organization data may be stored and generated by those third-party platforms. The organization-controlled data servers and third-party software platforms are examples of workspace data sources 120 that manage the data resources of an organization 110.

An organization 110 may implement one or more policies specifying access privilege and data requirements related to data resources of the organization 110. For example, the data access rights to a particular data resource (e.g., a dataset) may be assigned based on the roles, positions, hierarchy, and other natures of named entities 112. Each workspace data source 120 may also have its own data access conditions specific to an organization 110. In many situations, data access rights are changed due to circumstances and special requirements. While oftentimes an organization 110 is aware of certain data access rights and restrictions in place, it is usually challenging for the organization 110 to properly document each data access policy and change, whether such documentation is even practical without a data management server 130. For example, an organization 110 may not have a systematic way to implement data access policies among its employees based on the roles of the employees. There can also be multiple administrator devices that grant or revoke access privileges in various situations, some more system- atically while others are ad hoc. This makes an organization 110, particularly a larger one, difficult to understand data access situations of various named entities 112 and manage data accordingly. The data management server 130 provides various solutions to improve the data management of orga- nizations 110.

Named entities 112 associated with an organization 110 may be any suitable entities that are identifiable, such as people, employees, teams, groups, departments, customers, vendors, contractors, other third parties, subsidiaries, and other sub-organizations. A user in the organization 110 is an example of a named entity 112. A user in this context may refer to a regular employee or an administrator of the named entity who takes the role of managing some resources, such as data resources of the organization 110. An administrator controls an administrator device 114. An organization 110 may maintain a hierarchy of named entities, which contains information about the relationships among the named enti- ties. A hierarchy may take the of an organizational chart and employee hierarchy. Data access policies may be determined based on one or more hierarchies maintained by the orga- nization 110. In some embodiments, an administrator, through an administrator device 114, may review data access information and grant or revoke data access privilege through the service provided by the data management server 130. Each named entity 112 may be associated with various activities and history of data use of the data resources of the organization 110.

Workspace data sources 120 are components that main- tain and control data for an organization 110. A workplace data source 120 refers to any system, platform, or repository that contains information relevant to an organization's operations, activities, or employees. Workspace data sources 120 may take different forms. An example of a workspace data source 120 may be a data store, such as a data store 140, that stores data of the organization 110. For example, the workspace data source 120 may be a local data server or a Cloud server that stores data directly managed by the organization 110. In another example, a workspace data source 120 may be a software platform that provides service to the organization 110 based on data entered or provided by the organization 110. The software platform may be a software-as-a-service (SaaS) platform that runs software using domain-specific data. In some embodiments, the data may be provided by the organization 110 such as through linking the software platform to a data store 140 that stores the data of the organization 110. In some embodiments, the software platform itself may generate data for the organization 110 and store the data at another data store 140 or through the software platform's servers. In some embodiments, a workspace data source 120 may grant access to data based on access permission.

Workspace data sources 120 may also be referred to as access control systems. An access control system is delegated by an organization customer to control part of the data access of an organization 110 and maintains a data access history of one or more accounts of the organization 110. For example, a SaaS platform is retained by the organization 110 to generate and manage data associated with the organization 110 and may be an example of an access control system m. The SaaS platform provides data based on the data access permission of individual accounts.

In various embodiments, examples of workspace data sources 120 may include human resource systems, such as human resources management systems (HRMS) or human capital management (HCM) platforms that store employee data such as personal information, employment history, performance evaluations, and payroll details. Other examples of workspace data sources 120 may include customer relationship management (CRM) systems, including databases that contain information about clients, customers, or business contacts, including interactions, sales history, and customer preferences. Further examples of workspace data sources 120 may include enterprise resource planning (ERP) systems, such as integrated platforms that manage various aspects of business operations, including finance, supply chain, manufacturing, and inventory, generating data on transactions, orders, and inventory levels. Further examples of workspace data sources 120 may include communication and collaboration tools, such as email servers, instant messaging services, and project management tools where workplace communications and collaborations occur, generating data on interactions, discussions, and project progress. Further examples of workspace data sources 120 may include business intelligence (BI) tools and data warehouses that aggregate and analyze data from multiple sources to generate insights and reports for decision-making purposes. Further examples of workspace data sources 120 may include time tracking and attendance systems, including tools used to record employee working hours, absences, and attendance data. Further examples of workspace data sources 120 may include file storage and document management systems, including repositories for storing documents, reports, and other digital assets generated within the organization. In some embodiments, examples of workspace data sources 120 may further include physical devices such as internet-of-things (IOT) devices that are in the workplace, such as sensors, smart devices, and wearable technology, generating data on environmental conditions, usage patterns, and employee activities.

A workspace data source 120 may maintain the data access history of an organization 110. Forms of data access history in a workspace data source 120 may include records of who accessed specific files or databases, when they accessed them, and for what purpose. These metadata may be maintained in the form of metadata that captures user authentication details, timestamps, and the actions performed during each access instance. User authentication details may include user accounts, roles, or unique identifiers, while timestamps indicate the exact date and time of access. Additionally, the actions performed during access, such as viewing, editing, or deleting files, may be logged to provide records of data interactions. The data access history may also include data permission and authorization history such as when and who grants or revokes data access privilege of a particular named entity 112 to a data resource. Other relevant metadata related to data access may also be stored by the workspace data source 120.

A workspace data source 120 may provide one or more channels to allow the data and data access history maintained by the workspace data sources 120 to be exported to another entity. For example, a workspace data source 120 may offer Application Programming Interfaces (APIs), to facilitate the export of both data and data access history maintained within the workspace to another entity. APIs serve as a structured ways of communication between different software applications, allowing the data management server 130 to receive the data access history upon authorization from an organization 110. APIs may take different forms, such as a Representational State Transfer (REST) API that may take the form of stateless communication method over hypertext transfer protocol (HTTP). Other forms of APIs are also possible, such as GraphQL API with a query language that allows the data management server 130 to specify the desired fields and relationships in the queries. APIs may also include webhooks, which may take the form of HTTP callbacks triggered by events in the workspace data source 120, such as data access events. When data access events or data transfer events occur, a workspace data source 120 may send a notification to the data management server 130. The payload of the notification may contain relevant information about the event, including details of the data access history. Other forms of communication channels between a workspace data source 120 and the data management server 130 may include a file-based exports that periodically export data access history in a structured file format (e.g., JSON or CSV) to a designated location accessible by the data management server 130. In some embodiment, a communication channel may include a database replication or sync to allow the data management server 130 to directly connect to database of the workspace data source 120 for real-time replication or synchronization of data access history. In some embodiments, a communication channel between a workspace data sources 120 and the data management server 130 may take the form of a data stream that allows a continuous flow of data access events or updates from the workspace data source 120. This stream of data typically may include real-time or near-real-time information about various data access activities within the workspace environment, such as user logins, file accesses, modifications, or deletions.

The data management server 130 provides data management service to one or more organizations 110 to oversee and regulate access to data within an organization 110. The data management server 130 may collect data and related metadata such as data access history of various workspace data sources 120 of an organization 110 and provide analysis to the organization 110 with respect to data access, data policy management and compliance, and centralized data administration and monitoring. Workspace data sources 120 often have a large volume of data traffic and may store metadata related to data access in different non-standardized formats. In some embodiments, the data management server 130 may transform the metadata according to a standardized data schema and consolidate the data access information from various workspace data sources 120 into a centralized datastore as objects that are arranged according to the standardized data schema. In some embodiments, the data management server 130, using the standardized and consolidated data objects, may provide various applications and analyses related to data management to the organization 110, such as activity-based composite data access and permission graphs, display and illustration of data access permission and restrictions, automatic access policy generation and determination, convenient grant and revocation of data access, and data access risk assessment. The more detailed operations of the data management server 130 and other examples of services and features provided by the data management server 130 are further discussed in this disclosure.

In some embodiments, the data management server 130 may provide adaptive security application scenarios to help organizations reduce access management and governance complexity. The data management server 130 may help an organization 110 to reduce the risk level, eliminate the friction in identity management and governance, and enable adaptive security. In some embodiments, the data management server 130 may provide continuous access evaluation. For example, the data management server 130 may provide a dashboard to an organization 110 to provide access and security assessment. The dashboard may take the form of an access utilization dashboard, which can provide a solution that helps organizations 110 to identify and manage inactive user accounts and permissions, thus reducing the risk of security attacks and improving overall security. The dashboard may provide real-time insights and the ability to easily remove or adjust access by an administrator device 114. The dashboard streamlines the process of continuous access evaluation, making it simple for administrators to adhere to compliance and enhance the security posture of an organization 110.

In some embodiments, the data management server 130 may offer comprehensive utilization review functionalities, encompassing the identification of inactive and dormant accounts, analysis of active accounts and unused permissions, and evaluation of the overall security posture by tracking the percentage of active accounts and the trends over time. The data management server 130 may identify accounts with no user activity or logins within a specified timeframe. Additionally, or alternatively, the data management server 130 may scrutinize active accounts, defined by recent activity within a predetermined period, and examine permissions that remain unused by users over a specified time frame. The access utilization reports may also include trends, such as a sudden increase in data access of a specific account or permission. The data management server 130 may recommend remediation actions to an organization 110 to address dormant accounts and unused permissions, thereby fortifying security measures.

In some embodiments, the data management server 130 may provide risk monitoring to identify and mitigate potential security and access risks, enhancing overall security posture and compliance through real-time insights and automated decision-making processes. The data management server 130 may provide real-time insights and automated decision-making processes, thereby simplifying the complexity of security and access management. The risk level analysis may take the form of a risk level review that identifies high-risk activities exercised recently. The risk level analysis may also take the form of an overall risk score that may change over a period of time. In remedying the identification of a high-risk activity, the data management server 130 may provide an alert and a suggested action for the organization 110 to address the high-risk activity. In some embodiments, for a high overall risk score, the data management server 130 may provide suggestions and identify specific activities or data resources that are related to the high-risk score.

In some embodiments, the data management server 130 may provide access hygiene review capabilities that assess risk levels and monitor risk score trends, prescribing remediation actions for high-risk activities and proactive measures to uplift the risk score. In some embodiments, the data management server 130 may provide access analytics to provide an organization 110 real-time analyses into access governance, risk reduction, and security posture enhancement, allowing for detailed analysis of access activities, resource access, and permission posture through graphical representations.

In some embodiments, the data management server 130 may provide access analytics that may take various forms to provide real-time analyses for an organization 110 to improve access governance, reduce risks, and enhance security posture. An example of access analytics may be providing detailed access graphs that illustrate access paths and permissions within an organization 110, allowing administrators to access details of various workspace data sources 120 used by the organization 110. The output of the data management server 130 may include analysis of the access graph and event data that identify the risk vulnerabilities and the corresponding severity rankings. In some embodiments, an access graph may include activity analysis based on the access graph query result. Access activities may show the name of the actor, time stamp, risk severity, anomaly versus regular activities, and other suitable indicia. The data management server 130 may provide various access activity analysis features to identify accesses that are exercised in an organization 110, such as recent access activities across the organization 110, or certain units in the organization 110. The activity level analysis may be stored and presented in the form of a time series to allow an administrator of the organization 110 to review activities in different timeframes with respect to a specific user, a specific account, and/or a specific data resource. The permission posture may be presented as an access graph to illustrate activities exercised on a permission set.

By way of example, the data management server 130 may provide a composite data access graph that illustrates connections between accounts and data resources and additionally provides a summary of to data access activities of the accounts to the data resources. The data management server 130 may query various sets of metadata received from different workspace data sources 120 and generate graph objects according to a standardized data schema. The graph objects may include nodes that represent accounts, data resources, and data access activities. The data management server 130 may also store edges that record connections between two nodes in order to establish a graph. The data management server 130 may use a graph algorithm to generate a graph that illustrates the connections between accounts and data resources. The graph may be generated with respect to a named entity who may have multiple accounts across different workspace data sources 120. The graph may include nodes representing an account and a data resource that is connected to represent the data permission of the named entity to the data resource and a graphical representation of a data access activity level of the account accessing the data resource. The data access activity level may be aggregated from the activity objects representing the instances of the account accessing the data resource. For example, the graphical representation may take the form of a line that connects an account node in the graph and the data node representing the data resource. The thickness of the line may be commensurate with the data access activity level. In some embodiments, the nodes in an access graph are selectable for display of attributes of the selected nodes and for the performance of data access management tasks such as granting or revoking access.

In some embodiments, the access graphs may be generated in the forms of user access graphs and resource access graphs. In some embodiments, a user access graph may focus on a named entity. For example, a user access graph may illustrate how a specific user gains access to a particular data resource, showing resources accessible to the user along with the access paths, delineating the access permission from identity to role, permission, and finally, the data resource. In some embodiments, a resource access graph may focus on a data resource. For example, the resource access graph may elucidate how access to a particular resource is granted to a specific user, displaying users with access to the resource and their corresponding access paths, illustrating the progression from the resource to permission, role, and identity. These graphical representations offer an understanding of access paths and permissions, facilitating efficient access management and security administration.

In various embodiments, the data management server 130 may take different suitable forms. For example, while the data management server 130 is described in a singular form, the data management server 130 may include one or more computers that operate independently, cooperatively, and/or distributively. In some embodiments, the data management server 130 may be a server computer that includes one or more processors and memory that stores code instructions that are executed by one or more processors to perform various processes described herein. In some embodiments, the data management server 130 may be a pool of computing devices that may be located at the same geographical location (e.g., a server room) or be distributed geographically (e.g., cloud computing, distributed computing, or in a virtual server network). In some embodiments, the data management server 130 may be a collection of servers that independently, cooperatively, and/or distributively provide various products and services described in this disclosure. The data management server 130 may also include one or more virtualization instances such as a container, a virtual machine, a virtual private server, a virtual kernel, or another suitable virtualization instance. The data management server 130 may provide organizations 110 with various data management services as a form of cloud-based software, such as software as a service (SaaS), through the network 160. In some situations, the data management server 130 may also refer to the entity that operates the data management server 130.

The system environment 100 may include various data stores 140 that store different types of data for different entities. For example, one or more workspace data sources 120 may each be associated with a data store 140. An organization 110 may also have data stores 140 that store the organization's data. In this situation, the data store 140 may be an example of one type of workspace data source 120. The data management server 130 may also use one or more data stores 140 to store data related to preference, configurations, and other specific data associated with each organization's customer. The data access metadata that is standardized by the data management server 130 may also be stored as data objects in one or more data stores 140.

Each data store 140 includes one or more storage units, such as memory, that take the form of a non-transitory and non-volatile computer storage medium to store various data. The computer-readable storage medium is a medium that does not include a transitory medium, such as a propagating signal or a carrier wave. In one embodiment, the data store 140 communicates with other components by the network 160. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc. In some embodiments, instead of a cloud storage server, a data store 140 may be a storage device that is controlled and connected to the data management server 130. For example, the data store 140 may take the form of memory (e.g., hard drives, flash memory, discs, ROMs, etc.) used by the data management server 130, such as storage devices in a storage server room that is operated by the data management server 130.

A user device 150 may also be referred to as a client device. A user device 150 may be controlled by a user who may be the user of the data management server 130, such as an administrator of the organization 110. In such a case, the user device 150 may be an example of the administrator device 114. In some cases, a user device 150 may be controlled by an employee of an organization 110. The user device 150 may be used to gain access to one or more workspace data sources 120, such as to access a software platform provided by one of the workspace data sources 120. The user device 150 may be any computing device. Examples of user devices 150 include personal computers (PC), desktop computers, laptop computers, tablet computers, smartphones, wearable electronic devices such as smartwatches, or any other suitable electronic devices.

A user device 150 may include a user interface 152 and an application 154. The user interface 152 may be the interface of the application 154 and allow the user to perform various actions associated with application 154. For example, application 154 may be a software application, and the user interface 152 may be the front end. The user interface 152 may take different forms. In one embodiment, the user interface 152 is a software application interface. For example, a business may provide a front-end software application that can be displayed on a user device 150. In one case, the front-end software application is a software application that can be downloaded and installed on a user device 150 via, for example, an application store (App store) of the user device 150. In another case, the front-end software application takes the form of a webpage interface of organization 110 that allows clients to perform actions through web browsers. The front-end software application includes a graphical user interface (GUI) that displays various information and graphical elements. For example, the GUI may be the web interface of a software-as-a-service (SaaS) platform that is rendered by a web browser. In some embodiments, user interface 152 does not include graphical elements but communicates with a server or a node via other suitable ways, such as command windows or application program interfaces (APIs).

In system environment 100, multiple different types of applications 154 may be operated on a user device 150. Those applications 154 may be published by different entities and be in communication with different components in the system environment 100. For example, in some embodiments, a first application 154 may be a software application that is published as one of the workspace data sources 120 for the employees of the organization 110 to perform work-related tasks. In some embodiments, a second application 154 may be a data management application published by the data management server 130 for a user to perform data management and view composite data graphs. These are merely examples of various types of applications 154 that may be operated on a user device 150.

The communications among an organization 110, a workspace data source 120, the data management server 130, a data store 140, and a user device 150 may be transmitted via a network 160. The network 160 may be a public network such as the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet-switching networks such as the Internet.

Data Ingestion Pipeline Architecture

Figure 2:
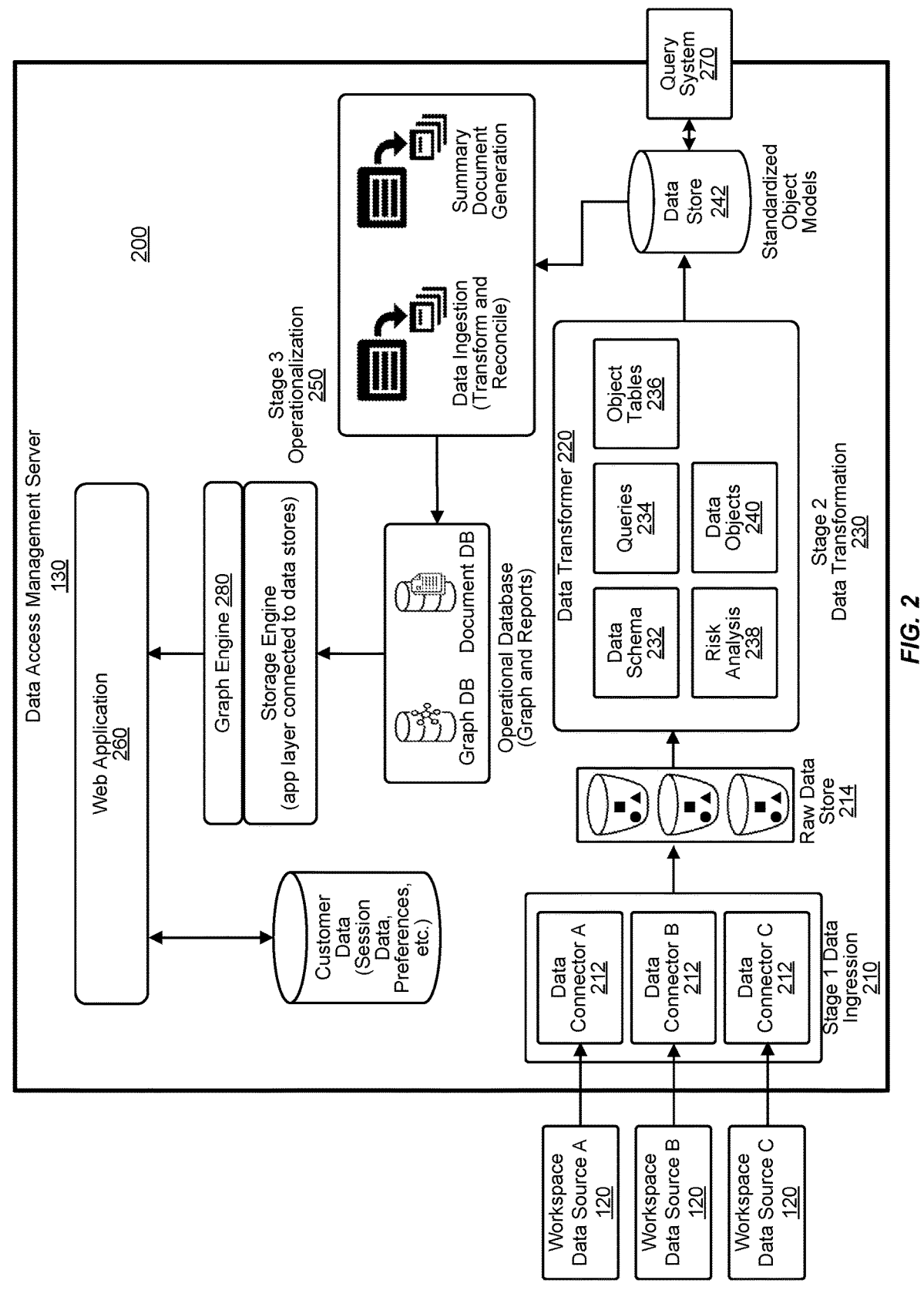
FIG. 2 is a block diagram illustrating an example data pipeline of the data management server, in accordance with some embodiments.

FIG. 2 is a block diagram illustrating an example data pipeline 200 of the data management server 130, in accordance with some embodiments. FIG. 2 illustrates the data pipeline 200 in which the data management server 130 receives data from various workspace data sources 120, normalizing the data, and rendering the standardized data objects to operational databases (graph and document databases). While the discussion of FIG. 2 is described using one organization 110, the data pipeline 200 may be repeated for multiple organization customers of the data management server 130, with some of the organizations 110 using the same types of workspace data sources 120. The data pipeline 200 includes intermediate storages and separation of data store per organization 110, in accordance with some embodiments.

The data pipeline 200 may include three main stages which may be referred to as the first stage of data ingression 210, the second stage of data transformation 230, and the third stage operationalization of data 250. The data ingression stage 210 may involve connecting the data management server 130 to various workspace data sources 120 and enabling the data management server 130 to receive data and metadata of an organization 110 from those connected workspace data sources 120. The data transformation stage 230 may involve the data management server 130 standardizing various data formats, generating data objects according to a standardized data schema, and classifying data objects based on attributes defined by the data management server 130. The data transformation stage 230 may also include data enrichment such as performing computations on transformed data and add data from additional sources (e.g., external sources and open world data) to enrich the normalized data for downstream applications such as risk analysis. The data operationalization stage 250 may involve putting standardized data objects into various downstream applications and storing data in operational databases ready to be rendered for users. In various embodiments, the data pipeline 200 may include additional, fewer, and different stages. The features and functions described in each stage may also be distributed differently from the explicit example discussed in FIG. 2.

The data ingression stage 210 may include onboarding, channel establishment, some quick conversions of file formats, and other data ingression steps. The data management server 130 may receive a grant of permission from the organization customer to receive data of the organization customer from a workspace data source 120, such as SaaS platform. In some embodiments, the onboarding may include an initialization of channel establishment that allows the provisioning of the organization customer's credentials for the organization 110 to authorize the data management server 130 to establish a data connector 212 to pull data from a workspace data source 120. In some embodiments, the data management server 130 may provide an onboarding user interface for the organization 110 to authorize the sharing of organization data with the data management server 130. An instance of a data connector 212 may be created and store a customer-provisioned token for connection with a workspace data source 120.

Common workspace data sources 120 may include different data connection methods and the data management server 130 may include various data connectors 212 tailored to the workspace data sources 120. Common workspace data sources 120 may include SALESFORCE, SERVICENOW, GOOGLE WORKSPACE, MICROSOFT 365, DROPBOX BUSINESS, SLACK, ASANA, ATLASSIAN, SAP, etc. but examples of workspace data sources 120 are not limited to those explicitly discussed. In some embodiments, the data management server 130 may establish an instance of a data connector 212 per domain (workspace) per data source instance (per software application). For example, an organization 110 may have three domains, North America, Asia Pacific, and Europe Middle East Africa, and all three domains have two workspace data sources 120. In such as case, the data management server 130 may establish size instances of data connectors 212 and establish six data pipelines. In some embodiments, the data pipeline separation may be purely logical. Instances of data connectors 212 and downstream data pipelines may share common computing and processing resources. In some embodiments, each domain may be treated as a separate organization 110, and data is shared between two domains.

The data management server 130 may maintain a hierarchy of instances to distinguish various organizations, workspaces, software applications, and data resources that are monitored. For example, a customerID may be a unique identifier that represents the organization's customers. The systemWorkspaceID may be a unique identifier that represents a specific workspace within an organization 110. Some organizations 110 might have a single workspace. The applicationInstanceID may be a unique identifier for a software application instance, such as a SaaS platform that may be an example of workspace data source 120. The applicationName may be the name of the software application.

In some embodiments, the types of data connectors 212 vary based on the data channels supported by the workspace data sources 120. A workspace data source 120 may provide one or more data channels to allow the data and metadata related to data access history maintained by the workspace data sources 120 to be exported to the data connectors 212. For example, a workspace data source 120 may offer Application Programming Interfaces (APIs). APIs may take different forms, such as a RESTful API, GraphQL API, webhooks, etc. Other forms of data channels between a workspace data source 120 and a data connector 212 may include file-based exports in a structured file format (e.g., JSON or CSV). In some embodiments, a data channel may include a database replication or sync to allow a data connector 212 to directly connect to the database of the workspace data source 120. In some embodiments, a data channel between a workspace data source 120 and a data connector 212 may take the form of a data stream that allows a continuous flow of data and updates from a workspace data source 120.

In some embodiments, the data ingression stage 210 may involve the storage of raw data and a simple conversion of raw data to a common file format. The file format may be in comma-separated values (CSV), JavaScript Object Notation (JSON), extensible markup language (XML), or another suitable format, such as key-value pairs, tabular, or spreadsheet format. The data management server 130 may store the data in a raw data store 214, such as AMAZON WEB SERVICES (AWS) S3 buckets, AZURE BLOB STORAGE, IBM OBJECT STORAGE, DIGITALOCEAN SPACES, etc. The raw data from different workspace data sources 120 may be converted to a file format such as the CSV format. The raw data files may contain the raw data with identifiers that correspond to source table names in the workspace data sources 120 and columns in CSV files (or another file type) that match the field from the source schema.

In some embodiments, the data transformation stage 230 may process and transform the data received from various workspace data sources 120. The data transformation stage 230 may be performed by a data transformer 220, which may include sets of instructions for performing various data transformation operations as discussed below. The data transformer 220 may be a data processing unit to perform data processing tasks. In some embodiments, the data transformer 220 may include memory and one or more processors. The memory stores the instructions. The instructions, when executed, cause one or more processors to perform the data processing tasks.

The raw data in the raw data store 214 may be treated as the data source in the data transformation stage 230. Data query, normalization, aggregation, and other transformation operations may be performed. The output of the data transformation stage 230 may be created as data objects 240 according to a standardized data schema defined by the data management server 130. The data objects 240 may be structured and standardized and may be stored in a relational database. The data object may be stored in any suitable structured formats, such as comma-separated values (CSV), JavaScript Object Notation (JSON), extensible markup language (XML), or another suitable format, such as key-value pairs, tabular, or spreadsheet format. The created data objects 240 may be stored based on the types of data objects

240 in one or more object tables 236. In some embodiments, formal relational databases may be used. The data management server 130 maintains per-workspace isolation by creating separate database instances for each organization customer and its domains.

In some embodiments, the data transformation stage 230 may store graph objects according to a data schema 232. The data schema 232 may be defined and standardized by the data management server 130. A graph object includes attributes whose values are generated based on querying the sets of metadata that are stored in the raw data store 214. While the raw data may include different fields and formats based on the workspace data sources 120, the data transformation stage 230 may re-generate the data to create graph objects. The graph objects may include different types such as node objects and edge objects. The node objects may include an account node type. Each account node may represent an account from a workspace data source 120. The node objects may also include a data resource node type. Each data resource node may represent a data source that is stored in a workspace data source 120. The node objects may further include an activity node type. An activity node may represent an instance of data access activity. For example, when an account accessed a data resource at a workspace data source 120, a data access activity was recorded and the data management server 130 in the data transformation stage 230 captures the activity and creates an activity node. The graph objects may also include an edge type. An edge may identify a connection between any two types of nodes in the data schema 232.

The data schema 232 implemented within the data management server 130 may define data object formats and attributes for data objects 240 that are commonly various downstream applications of the 130. In some embodiments, the data schema 232 may adopt a network graph model. The data schema 232 may define an integrated representation of a data access graph, where nodes signify elements and edges illustrate the interactions among nodes. The graph data objects 240 created according to the data schema 232 may enable downstream applications to execute various graph theory algorithms, enabling functionalities such as path identification and cluster discovery essential for comprehensive data analysis. The data schema 232 may represent asset classes and individual assets, which permits the mapping of permissions and events for analytical assessment. For instance, within certain SaaS applications, the data schema 232 delineates between broader asset classes (such as "resources") and granular instances of singular assets (such as "resource instances"). This distinction allows for a nuanced analysis of permissions and events applicable to both the broader asset class and individual instances, thereby enhancing the analytical depth. In some embodiments, the data schema 232 may integrate event or user activities into the access-graph framework, representing these activities as nodes to establish meaningful relationships between actors and data resources. This integration facilitates the analysis of access path usage, aiding in the identification of underutilized or infrequently accessed pathways within the access-graph structure. The data schema 232 within the data management server 130 provides a framework for data standardization, analysis, and optimization across various downstream applications.

Without the loss of generality, however, in this disclosure, a data resource may simply refer to a resource or a resource instance unless the two concepts are specifically distinguished. Likewise, a general use of the resource node may refer to either the resource node or a resource instance node.

While graph objects that are defined according to a data schema 232 are described, the data management server 130 may also create other types of data objects 240. The generation of various data objects 240 may include querying various events from the raw data and selecting the attributes based on a predefined data schema 232. A data object created may include the attributes and an identifier signifying the instance of the data object. The data objects 240 of the same type may be stored in a data table that may be queried and sorted structurally based on the attributes of the type of data objects 240.

The generation of data objects 240 in the data transformation stage 230 may include the data management server 130 querying the raw data based on one or more attributes as defined by the data schema 232. For example, one type of data objects 240 may be account objects that have attributes such as user_name, email, title, accountType, creationDate, lastModifiedDate, etc. The data management server 130 may generate one or more queries to the raw data store 214 for the metadata from various workspace data sources 120 and capture accounts that have one or more of those attributes. In another example, another type of data objects 240 may be activity objects that have attributes such as sourceName, sourceRole, creationDate, lastModifiedDate, activity, etc. The data management server 130 may generate one or more queries to the raw data store 214 for the metadata from various workspace data sources 120 and capture activities that are performed on one or more data objects. In yet another example, the type of data objects 240 may be data resource objects that have attributes such as application-Name, applicationRole, createdDate, lastModifiedDate, userLicenseID, userLicenseStatus, lastActivity, etc. The data management server 130 may generate one or more queries to the raw data store 214 for the metadata from various workspace data sources 120 and capture data resources according to the queries and attributes. In some embodiments, data objects 240 may also include edges that record the connections between two data objects. The data management server 130 may generate one or more queries to identify relationships between various data objects 240. The created data objects may be arranged by types in various one or more object tables 236 and the data objects 240 and corresponding object tables 236 may be stored in the data store 242 as standardized object models. Data objects 240 from different domains or different organizations may be separately stored.

The data transformation stage 230 may also include data enrichment before data objects 240 are stored. Data enrichment may involve augmenting the existing data with additional information sourced from various external or internal data sources. The additional information may include demographic data, geospatial data, historical trends, or customer behavior patterns. By way of example, the raw data may include internet protocol (IP) addresses. The data management server 130 may connect to an external database to determine the geolocation of an IP address and also any corresponding transmission identification information associated with the IP address. The raw data may also include email addresses. The data management server 130 may determine various header information of the email addresses. Other suitable enrichment may include identifying the nature of a data instance and querying any suitable external databases (e.g., public, authority, government, and other available databases) to add one or more attributes to the data that are not originally presented in the raw data. In some embodiments, the data management server 130 may also have heuristics or other algorithms to analyze the data to enrich the raw data to generate one or more attribute values of the output data objects 240 in the data transformation stage 230.

In some embodiments, the data transformation stage 230 may include a risk analysis 238 that may analyze either or both the raw data and the data objects 240. The risk analysis 238 may take the form of a risk level review that identifies high-risk activities, such as usual accesses, exercised recently. The risk level analysis may also take the form of an overall risk score that may change over a period of time. In remedying the identification of a high-risk activity, the data management server 130 may provide an alert and suggest action for the organization 110 to address the high-risk activity. In some embodiments, for a high overall risk score, the data management server 130 may provide suggestions and identify specific activities or data resources that are related to the high-risk score.

The data objects 240 stored in the data store 242 may serve as standardized object models for the data management server 130 to perform various downstream applications, such as the generation of composite graphs, further risk analysis, data access management, and revocation, data management policy identification and enforcement, and other features of the data management server 130 that are described in this disclosure.

The third stage in the data management pipeline of the data management server 130 may be the data operationalization stage 250. The data objects 240 may be further organized and transformed into the application-ready stage. This stage may optimize the data so that the data is ready for downstream application consumption. Depending on the type of downstream application, the data operationalization stage 250 for each downstream application may be different.

By way of example, one downstream application may be the display and generation of data access composite graphs. In some embodiments, there may be two formats of storage, which are graph database and document database. The data objects 240 in the data store 242 may be converted into graph objects that are comparable to a graph database architecture that will serve for graph visualization, graph network queries and implementations of graph network analysis algorithms. The data objects 240 in the data store 242 may also be analyzed by one or more algorithms to generate summary reports that are optimized to provide high-performance access to report pages (such as access utilization, risk summary, etc.) in the document database. In the data operationalization stage 250, the data management server 130 may also store organizational customer data, such as session data, preferences, configurations, etc., and use the customer data to render the graphs and reports. The final results may be rendered in the web application 260, which may be an example of application 154 in FIG. 1. For data access graph rendering, the data management server 130 may use a graph engine 280, such as one or more graph platform API, to render the graphs based on the node and edge objects stored as part of the data objects 240.

Combining the various stages, the data management server 130 may include the following features in some embodiments. For example, the data management server 130 may provide scalable onboarding with supported applications. Adding new customer instances (a new workspace or a supported application in a workspace) may be configuration-driven. The data management server 130 may perform by updating metadata definition in the ingress stage (connector metadata). Other pipeline stages and processing should be auto-provisioned and triggered automatically.

The data management server 130 may also provide application features agility. The data management server 130 provides wrapping of external heterogeneous schemas to transform into a standardized object model to decouple applications features development from various external workspace data sources 120. Applications can build features on top of the standardized object model agnostic to underlying SaaS application-specific raw data or changes in risk processing algorithms. When the system introduces new user-facing features in user-facing applications-like new filters, reports, network graph visuals, etc., the system adopts the changes with minimal changes in the final stage only.

The data management server 130 may also be observability-ready. Each data connector 212 and data ingression pipeline instance may be implemented as per workspace, per application instance in a workspace. This provides observability to track the status and history of each data pipeline instance. This may also provide logging for single pipeline instances run for diagnostics and alerting capability on pipeline failure. The data operationalization stage 250 may provide the following observability features, such as a dashboard to get the status of each pipeline, last execution details (timestamp, success, failure, data processed statistics), an alert on the failure of any stage on a data pipeline instance, and a way to review the logs of specific data pipeline instances run for diagnostic purposes.

The data management server 130 may also provide a standardized new SaaS applications onboarding, which follows a standard implementation process for integration. Implementation work may establish a new implementation of a data connector 212 in the data ingression stage 210 and new data processing in risk analysis and data transformation implementation in the data transformation stage 230. The data operationalization stage 250 with application-specific logic (reports, graph analysis) in turn works transparently.

Example Data Model Schema

Figure 3:
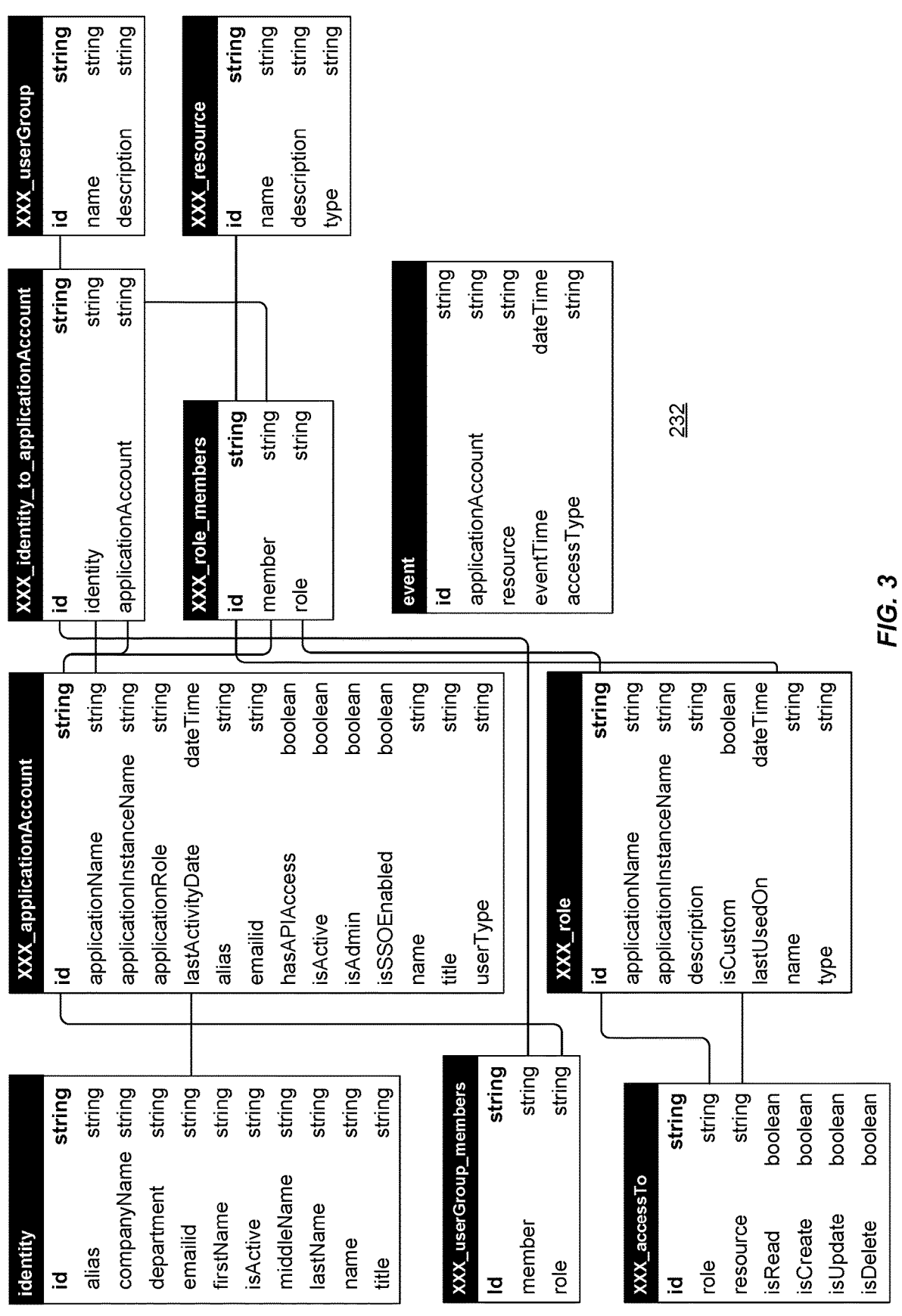
FIG. 3 is an example of a data schema that may be used by the data management server, in accordance with some embodiments.

FIG. 3 is an example of a data schema 232 that may be used by the data management server 130, in accordance with some embodiments. In some embodiments, the data schema 232 may be an abstract layer of various schema formats of various applications. Application logic may be built on the data schema 232, which enables the data management server 130 to support a common set of adaptive access features across various downstream applications in the data operationalization stage 250.

In some embodiments, the common data schema 232 allows the data management server 130 to ingest heterogeneous data models of identity and access management (IAM) schemas, rules, and events from various workspace data sources 120 and transform the data into a common knowledge graph data model that contains objects (nodes) and relationships (edges). In the data transformation stage 230, the data management server 130 may identify the common access graph entities (applicationAccount, userGroup, role, resource, and resourceInstance).

In some embodiments, the object model for the data objects 240 according to the data schema 232 may have multiple entities. Examples of the objects include identity, applicationAccount, userGroup, resource, accessTo, etc. Each object may be a type of node that may be used by the data management server 130 in generating a data access graph. In some embodiments, the various types of objects may have one or more relationships related to other types of objects or the same types of objects (e.g., sub-types). For example, the identity object may be derived from the identity system and represent a named entity. Each identity can have one or more applicationAccounts. ApplicationAccount can have membership to one or more userGroup and/or roles. UserGroup can be nested. UserGroup can have child userGroup. A userGroup can be a member of one or more roles. Roles can be nested. Roles can have child roles. Roles can have permission to one or more data resources. The relationship between an applicationAccount and a resource may be specified by an accessTo data object that specifies the role that has access permission to the resource.

An identity node may represent a unique identity in the data management server 130. An identity node may be a uniquely identifiable identity that represents a named entity within an organization. If a workspace data source 120 is an identity system, the data management server 130 may use the identity from the identity system to represent the account. When other workspace data sources 120 (e.g., other SaaS applications) are onboarded before identity system onboarding, the data management server 130 may use employee emails as identifiers of the accounts.

An applicationAccount node may be used to uniquely identify an account in a software application such as a SaaS platform. A named entity identified by an identity node can have multiple applicationAccounts in different software applications. For example, an employee can have a first application account in SaaS platform A and a second application account in SaaS platform B.

A userGroup node may be a collection of users who can be assigned to a role. A userGroup allows an organization 110 or a software platform to manage permissions for a specific set of users. Users can be added or removed in a userGroup nodes. For example, in a data model of an example workspace data source 120, a "profile" may be equivalent to the user group. Other SaaS applications may have a first-class concept of user groups in their object model. The data management server 130 may translate these types of access management data from the workspace data source 120 to the object model of the data management server 130 in the data transformation stage 230.

A role node may be a collection of permissions that can be assigned directly or indirectly to individual users (applicationAccount) or a user group. For example, in one SaaS platform, "PermissionSet" and "PermissionSetGroup" may be mapped to the role node in the data management server 130. Roles can be nested where a super role can contain other roles, in that case, the child role permissions may also be applied to parent role permissions.

A data resource node may be a unique identifier of a data resource that is being protected by permissions in a workspace data source 120, such as an access control system. A data resource can be a database table, an object, a record, a document, an application, a data instance, etc. A data resource is an instance that may require permission to access. In some embodiments, the data management server 130 may only ingress information (e.g., metadata) that uniquely identifies the data resource but not the actual content or data belonging to the data resource.

In some embodiments, the data management server 130 may also store various edge objects based on the data schema 232. Edge objects may include a hasApplicationAccount edge that establishes the relationship between an identity node and an applicationAccount node. An identity may be the owner of multiple application accounts.

Edge objects may also include a memberOf edge that establishes the relationship between an applicationAccount node and a userGroup node, between a userGroup node and a role node, and a userGroup node and another userGroup node, a role node and another role node, etc. This defines the member relationship among the accounts, groups, and roles in a workspace.

Edge objects may also include an accessTo edge that represents permission to a data resource. The accessTo edge may also include additional boolean attributes to identify the level of permissions enabled by this edge.

Each type of data object (node objects or edge objects) may be associated with one or more attributes. Some attributes may be mandatory for the data object type while other attributes may be optional. The attributes shown in FIG. 3 are examples only and each data object type may have additional, fewer, or different attributes. Some of the attribute fields can be a nested field that refers to another object type. For example, the accessTo object may have a role attribute and a resource attribute to identify which role has access permission to which data resource. Different workspaces may be associated with different prefixes to distinguish the workspace.

In some embodiments, the nodes or edges may include one or more of the following common attributes in the table below. These attributes are merely examples and the data schema 232 may include other attributes as defined by the data management server 130.

| Property | Type | Description |
|---|---|---|
| createdBy | string | Identifier of the creator of the node |
| createdDate | DateTime | Timestamp of the node creation |
| enabled | boolean | Is this node active |
| lastModifiedBy | string | Identifier of the last modifier of the node |
| lastModifiedDate | DateTime | Timestamp of the node's last update |
| displayName | string | Display string of the object representation in UI |
| nodeID | string | Internal elementID of the node in a graph database |
| uniqueID | string | A unique identifier generated during ingestion to uniquely identify a node. |

The data schema 232 may serve to standardize heterogeneous data definitions sourced from different workspace data sources 120, unifying the data into a cohesive representation of access-graph objects, their relationships, events, and associated risks. In some embodiments, the data schema 232 may adopt a network graph model to depict the object structure, where elements are nodes, and the corresponding interactions and connections manifest as edges within a network graph that may be referred to as the access graph.

The data schema 232 of the access graph, presented in a network graph representation, enables applications to execute various graph theory algorithms. These algorithms encompass path identification, cluster discovery, source-to-destination navigation, etc. This allows the data management server 130 to comprehend the behavior of identity and access configurations, evaluate risk, and assess the impact of changes within the graph structure over time. For example, the access graph data objects may be versioned and time-stamped such that the access graph may be generated as a time series of access graphs. Users reviewing the graph may go back in time to determine the change in access permission, data management, and access activities over time. In some embodiments, the data management server 130 may provide a graph user interface that provides a time scale for users to select the timing in a time series.

An example definition of the object model according to a data schema 232 may focus on the representation of data asset classes (resources) and the identification of distinct, granular instances of singular data assets (termed resource instances). This unique representation enables the mapping of permissions and events to both the broader class of data assets (resources) and the specific individual instances (resource instances) for analytical purposes. For instance, in certain workspace data sources 120, users can share tables and individual records within those tables. In the corresponding model according to the data schema 232, the table may be represented as a resource, encompassing all records within the table, while the records themselves are defined as resource instances. Consequently, an edge in the network graph representing permission (accessTo) can link to the resource when the permission pertains to all records, whereas a permission edge connecting to a resource instance node signifies permissions applicable to an individual record within the table. This versatile model facilitates the representation of diverse asset types and their instances within a unified object model.

Figure 4:
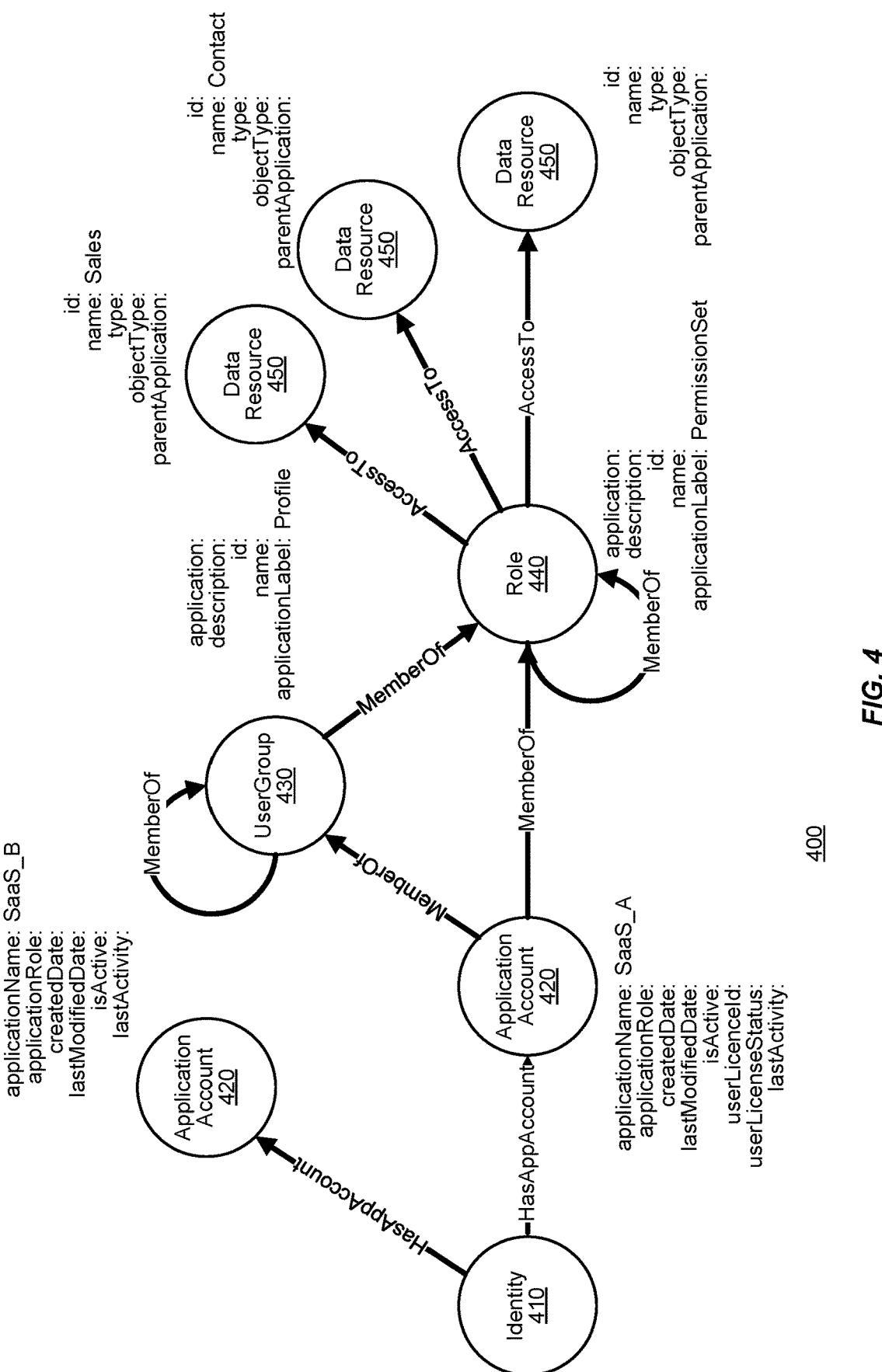
FIG. 4 is a conceptual diagram illustrating an access graph that connects nodes by edges that may take the form of vectors, in accordance with some embodiments.

FIG. 4 is a conceptual diagram illustrating an access graph 400 that connects nodes by edges that may take the form of vectors, in accordance with some embodiments. The data model may be a directed graph. Multiple nodes may be connected to form a composite vector. The data store 242 that stores the data objects 240 may take the form of a unified repository of identity, access policies, and events in a graph database. The data store 242 may store data objects 240 as node objects and edge objects.

The node and edge objects, when connected, may represent an access graph 400 that illustrates the data permission of a named entity to various data resources. For example, the access graph 400 may include an identity node 410, one or more application account nodes 420, one or more user group nodes 430, one or more role nodes 440, and one or more data resource nodes 450. Each type of nodes may include its own set of attributes. For illustration, not all values of the attributes are shown in FIG. 4. The data management server 130 may identify any data permission traversal path that traverses between an identity node 410 (or an application account node 420) and a data resource node 450 to identify data permission between a named entity and a data resource. By way of example, the identity node 410 may have different application accounts for SaaS platform A and SaaS platform B (each may be an example of a workspace data source 120). The application accounts may be represented by the application account nodes 420. For the application account node 420 of the SaaS platform A, the application account may belong to one or more user groups and one or more roles, which may be represented by the user group nodes 430 and the role nodes 440. A role may have access permission to one or more data resources that are represented by the one or more data resource nodes 450.

The data management server 130 may generate node objects and edge objects through queries. The data management server 130 may use structured queries (e.g., structured query language (SQL) queries) to classify data ingested from workspace data sources 120 (e.g., customer's SaaS platform's data) into one or more nodes and/or one or more edges based on queries on the attributes (e.g., as reflected in the metadata). For node objects, the data management server 130 may query the raw data store 214 to identify node objects that fit the attributes defined in the data schema 232. The data management server 130 may build queries specific to each workspace data source 120 because each workspace data source 120 has a different metadata format and fields for storing the metadata. For the edge objects, the data management server 130 may query the raw data store 214 and/or attributes in the node objects to identify connections between nodes. Edges may include identity-to-applicationaccount edge, role-member edge, access-to edge, and user-group-member edge, etc., as illustrated in FIG. 3. Each edge may include a unique identifier for the edge, a first node attribute and a second node attribute together serving as an identification of the connection, and one or more other attributes that signify the natures of the edges. For example, access-to edges may have attributes on the type of access. Alternatively, instead of being an edge, the access-to object may also be a node.

Example Event Nodes

In some embodiments, the data objects 240 according to the data schema 232 may include incorporating data events (e.g., user activities such as accessing or modifying the data) as data objects. Those event data objects and the corresponding associations may be incorporated into the access-graph framework. A standard access event may include an actor (e.g., a named entity represented by an identity or an application account) and a subject (a resource or resource Instance) on which the activity occurs. The data management server 130 may represent these activities as nodes within the access graph, establishing relationships between the actor and subject. As the access graph encompasses various connecting pathways between actors and subjects, the 130 may analyze the frequency of access path usage and identify underutilized or infrequently used paths within the access graph structure.

In some embodiments, event data ingestion may use the same data ingestion pipeline illustrated in FIG. 2. The data management server 130 may import events as nodes. In some embodiments, the event nodes may be with minimum required attributes and full details of scalar data for events may remain outside of the node objects for memory optimization. The data transformation stage 230 may generate two or more types of event tables. In some embodiments, the first type of event table may be a table for resource access events. The table may contain a list of events with reference to the actor (e.g., an ApplicationAccount node) and acted on node (a resource node) with timestamp and operation performed in the event. The second type of event table may be a table for activity risk detail, which may be a table that contains other attributes related to events. The second type of table allows tabular queries and includes detailed information about the events, such as data that are not stored as part of the event graph objects. An event identifier may be used for both tables to reference an event.

By modeling the events, the data management server 130 may perform various analyses related to data events and sequences of events. For example, the data management server 130 may identify and build timeseries of events related to specific actor nodes and data resource nodes that have past events. The data management server 130 may also build a time series of overall events and identify the impacted nodes in the time period. In some embodiments, a resource access event may include the information of the source node (e.g., actor) and the destination node (the data resource or resource instance). The data management server 130 may in turn generate an access graph to allow the detection of possible paths traversing the event. Events can have relationships, such as the sequence of events belonging to a session or generated from specific endpoints. Mapping Event nodes allows the data management server 130 to establish a knowledge base for event relationships.

Figure 5:
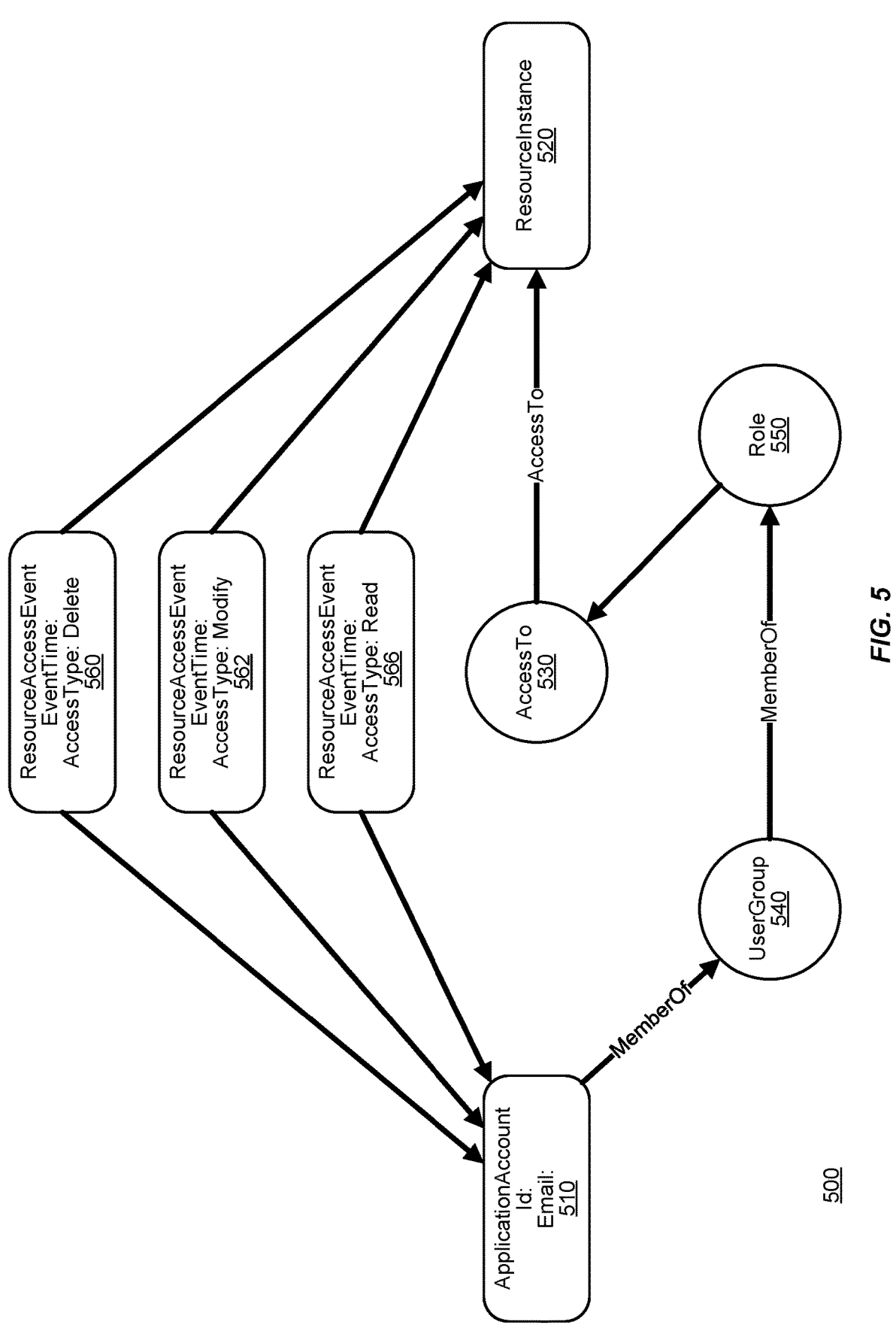
FIG. 5 is a conceptual diagram illustrating relationships of events between a source node and a destination node in an example access graph, in accordance with some embodiments.

FIG. 5 is a conceptual diagram illustrating relationships of events between a source node and a destination node in an example access graph 500, in accordance with some embodiments. The access graph 500 may include a source node, which is an application account node 510. The access graph 500 may also include a destination node, which is a resource instance node 520. In the access graph 500, the application account node 510 and the resource instance node 520 may be connected through one or more access permission traversal paths and event paths. The connection edges in each path may be referred to as vectors.

In some embodiments, an example access permission traversal path may connect the application account node 510 indirectly to a resource instance node 520 by traversing a plurality of intermediate object nodes. For example, the application account 510 may be a member of a user group node 540 and the user group node 540 is a member of the role node 550. The role represented by the role node 550 may have access permission to the data resource represented by resource instance node 520. The access permission may be represented by the access to node 530. As such, the application account node 510 and the resource instance node 520 are indirectly connected through one or more object nodes 530, 540, and 550. In some embodiments, an application account node 510 may have one or more reasons why access permission is granted for the application account to access a data resource. As such, more than one access permission traversal path may be recorded in the access graph. While the access permission traversal path illustrated in this example involves multiple intermediate nodes, in some cases an access permission traversal path may include only the source node and the destination node.

The data management server 130 may store a plurality of event nodes 560a, 560b, and 560c (collective event nodes 560 or individually event node 560) that have direct connections between the application account node 510 and resource instance node 520. Each path traversing the application account node 510, one of the event nodes, and the resource instance node 520 may be an event path. Each event node 560 may include attributes that specify the event type, such as the accessType attribute that signifies the event is a deletion of the data resource represented by the resource instance node 520, a modification of the data resource, and a read of the data resource. Each event node 560 may also be timestamped. In some embodiments, there can be anywhere between zero to many event paths between the application account node 510 and the resource instance node 520. For example, if the application account does not have any access event to the resource instance, there can be zero event path even though the application account node 510 and the resource instance node 520 are connected by an access permission traversal path. In some embodiments, the applicant account may frequently access the data resource. In turn, a large number of event nodes 560 may be stored. The data management server 130 may aggregate the number and the nature of event nodes 560 to display the access nature of an application account to a data resource. For example, if no event node is detected, the data management server 130, in a front-end graphical user interface, may show a dashed line between the application account node 510 and resource instance node 520. Any line, solid or dashed, may signify the presence of a data permission traversal path. The dashed line may signify there is no event node 560 detected. In some embodiments, a solid line may be presented to signify there are event nodes 560 detected. The thickness of the solid line may be commensurate with the number of event nodes 560 aggregated by the application account node 510.

Using the event nodes 560, the data management server 130 may provide an event mapping approach where events are represented as nodes in the graph with edges pointing to the source and destination nodes of the event. Event node 560 maintains information and attributes graph analysis, such as event timestamp, type of operation performed, actor who initiated the event, and data resource instance impacted by the event. Event attribute may include a pointer attribute to applicationAccount and a pointer to ResourceInstance, eventTimestamp, and type of operation (create, read, update, delete) of the event. In some embodiments, more attributes may be added. In some embodiments, only required event data attributes for rendering a graph are stored as part of the event nodes and other scalar event attributes may be maintained outside the graph objects.

Example Event Based Implementations

In some embodiments, the data management server 130 may capture data events with the timestamp of the event, the type of access performed and the actor of the activity. This allows one or more downstream applications in the data operationalization stage 250 for the use of access-graph knowledge base.

In some embodiments, the data management server 130 may provide time series activity analysis by a named entity and/or on a resource instance. This downstream application may include identifying activities performed by specific named entities within a defined time window. The data management server 130 may discover access paths, access events, target data resources, and actors involved in these activities. The data management server 130 may also analyze the time series of events performed on data resources and track the resource usage patterns within the same time window.

In some embodiments, the data management server 130 may track access permission traversal path utilization. The data management server 130 may identify access paths involved when an event is performed. The data management server 130 may calculate the frequency of exercise for various access paths and records the latest access time for each. This analysis provides insights into access permission traversal path utilization.

In some embodiments, the data management server 130 may investigate data resource access activities in an incident response. In the event of a security incident, the data management server 130 may trace back events and access to identify the source and scope of the breach, aiding in incident response and mitigation. In this downstream application, the data management server 130 may analyze the time series of resource access events performed around the incident time and identify name entities involved, access permission traversal paths, and data resource instances involved in activities.

In some embodiments, the data management server 130 may detect unexpected or hidden resource access activities. In this downstream application, the data management server 130 may identify activities occurring between a named entity and a data resource where no access permission traversal path exists. The detection may uncover potential security or access anomalies.

In some embodiments, the data management server 130 may implement access pattern anomaly detection. The data management server 130 may use machine learning or statistical models to detect anomalies in user behavior or access patterns. Unusual patterns may indicate security incidents or compromised accounts. Identifying behavior anomalies may include unusual access patterns such as sudden spikes in specific actor activities, unusual access attempts on specific resources, and access activities during odd hours. This analysis aids in detecting potential security breaches and irregular access patterns.

Example Query

The data management server 130 may provide customers with a data query feature for querying the data arranged in the data model in the data store 242. The data query feature may take any suitable form of a query system 270 such as an API query system. An accessGraph may be the root type that contains supported query types. A query can request a single object (e.g., account, group, resource, role) or a list of objects (accounts, resources, risks). In some embodiments, the query system of the data management server 130 may support at least a query to an access graph or query to a specific node object.

```
Updated API
type Query {
    AccessPath(nodeIds: [String!]!): AccessPath
    Identity(email: String, applications: [String]):Identity
    ApplicationAccount(id: String): ApplicationAccount
    AssignedPermission(id: String): AssignedPermission
    Resource(id: String): Resource
    ResourceInstance(id: String): ResourceInstance
    Role(id: String): Role
    Group(id: String): Group
    }
// Here AccessPath is list of nodes and edges
type AccessPath {
    edges: [AccessGraphEdge]
    nodes: [AccessGrapNode]
    }
```

In some embodiments, the data management server 130 may provide the query system 270 that allows customers to query for an access graph, which includes path traversing nodes between source node(s) and destination node(s). The data management server 130 may receive a query that specifies one or more source nodes and one or more destination nodes. In return, the data management server 130 may provide a query result of an access graph that identifies paths between any two nodes in the access graph. The query result may include intermediate nodes along a path and attributes of those nodes.

In some embodiments, the data management server 130 may support different types of queries to an access graph for any array of nodes. By way of example, un the first type of query, a query may specify a given identity or application account as the source node and a list of data resources as destination nodes. In return, the data management server 130 may generate a query result that contains the access paths from the specified identity to the given list of resources.

In the second type of query example, a query may specify a given resource as a destination node and a list of accounts or application accounts as source nodes. In return, the data management server 130 may generate a query result that contains the access paths to the specified resource from the given list of accounts. In various embodiments, there can be additional types of queries that can be directed to any specific type of nodes, edges, and attributes in an access graph.

In some embodiments, the data management server 130 may support other types of access graph queries. A list of attributes for each type of node may be schemaless. This enables the data management server 130 to extend nodes or add additional nodes in an access-graph model.

In some embodiments, the query feature may support filtering and pagination. Single object access for account, group, resource, role, etc. may be based on the unique identifier of the node. AccountLists and ResourceList may support filtering to fetch filtered results based on input filter parameters. Filtering may be based on filtering parameters, such as by number, string, timestamp, sorting, page information, etc. The data management server 130 may also support any structured query feature for customers to filter, sort, and other query operations.

In some embodiments, the query system 270 may also support event data queries. Event data query may provide various entry points to get event data for a given time period. In some embodiments, the query system 270 may support the query of an event list that has the entry point of the application account, data resource, and access path. For example, the entry point of the application account returns a query result that includes events initiated by the specified application account. The entry point of a data resource returns a query result that includes events that interacted with the specified data resource. The query may also specify edge parameters such as event count, which indicates the number of times a specific edge is utilized within an event path. Another query parameter may be lastEventtime, which denotes the most recent timestamp at which the event edge was exercised within an event path. It may return null if no event exercising the edge was recorded during the specified time period.

In some embodiments, the data management server 130 transforms various access models into a unified entity and relationships that develop the application layer capability of the data management server 130 to run the analytical and risk assessment algorithms in a standard form. Various access permissions (role based or attribute based access model) are represented as "accessTo" edges between an actor to a data resource.

The data management server 130 may track granular permission per actor and resource. Permission may contain additional attributes like type of permission (create, read, update, delete). When permissions are represented as edges in the graph, the rich information is represented as a set of attributes on the edge. This model allows for flattening the permission enabled by specific paths for deep analysis and tracking permission usage, and timeline at the granular level to individual actors in the system.

The data management server 130 may analyze relationship knowledge graphs between actors, resources to events, and perform risk scans. An access graph may be treated as a complete knowledge graph beyond a set of configurations, a data model is designed to track various runtime objects (like activities and risk scan results) in direct relationships with other schema entities. This overlay of dynamic information of events and scan results enables the data management server 130 to build relationships between the current state of the system with the history of activities, and risk scan results together to answer complex questions and investigations of access risk assessment and incident analysis.

Rendering of Data Access Graph

In some embodiments, access metadata sourced from workspace data sources 120 may undergo mapping through standardized relational queries to form a representation within the object schema 232, structured as nodes and edges. Key identity and access elements such as named entities, application accounts, groups, roles, events, and risks may be depicted as nodes within the access graph. Relationships, such as group and role memberships ("member of") and permissions ("access to") are manifested as vectors (directed edges) within the access graph. This transformation process serves to streamline heterogeneous data into a simplified schema of nodes and edges.

For instance, transformed tables such as applicationAccount, userGroups, roles, and resources may include node definitions within the system. Edge definitions in tables such as applicationAccount_memberOf_userGroup and userGroup_accessTo_resource contain references to source and destination nodes, delineating relationships within the dataset.

In some embodiments, the data management server 130 may render a front-end version of an access graph that connects the nodes and edges for the display to end users of the data management platform provided by the data management server 130. An access graph is a network graph representation that illustrates how access to one or more specific resources is enabled for an account.

Figure 6:
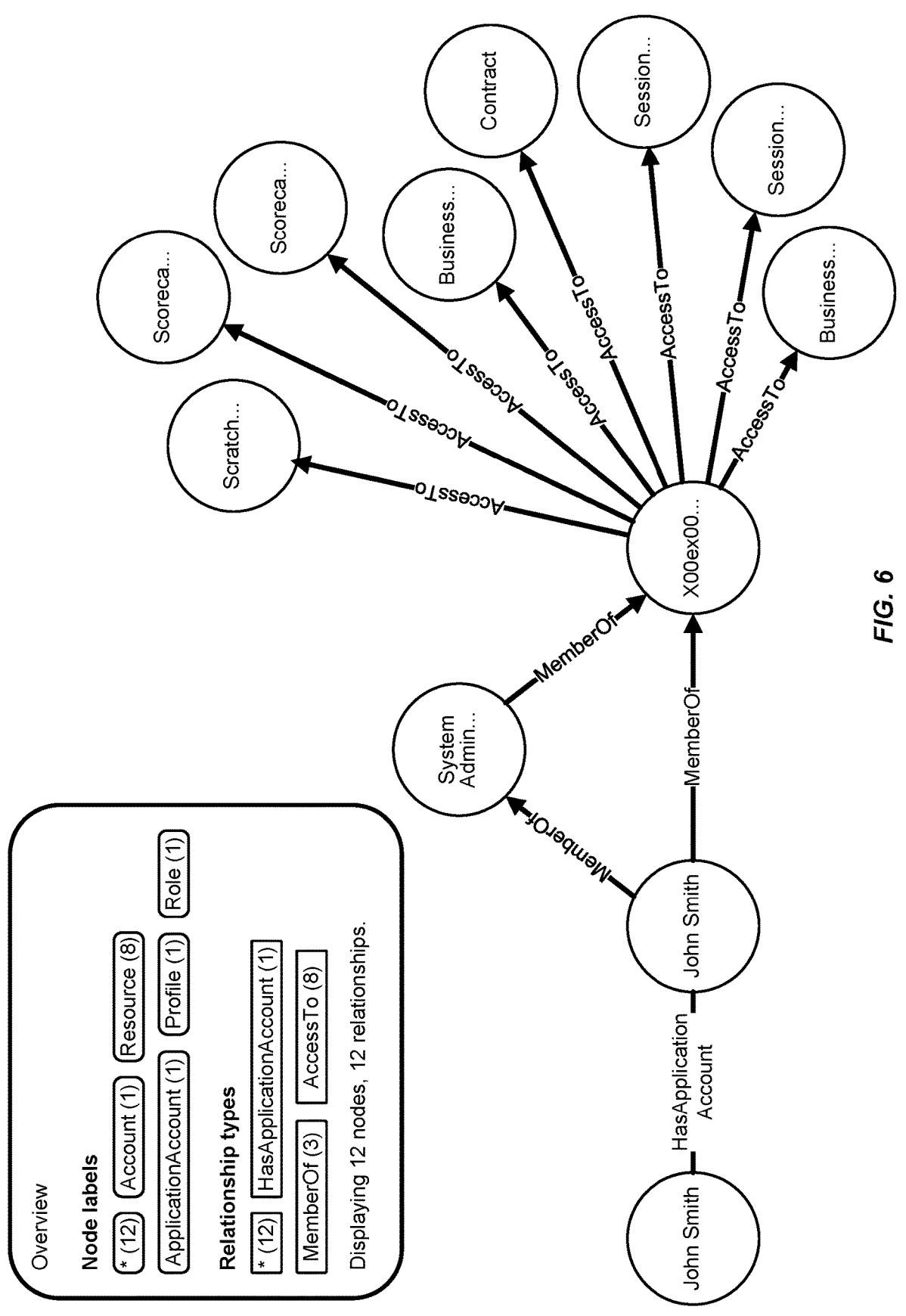
FIG. 6 is a conceptual diagram illustrating a rendered access graph, in accordance with some embodiments.

FIG. 6 is a conceptual diagram illustrating a rendered access graph, in accordance with some embodiments. An access graph has node types (account, applicationAccount, userGroup, role, resource) and edges (hasApplicationAccount, memberOf, accessTo). Further, permissions and roles also may be assigned. Access permission may be represented as AccessTo edges directed to resource nodes.

In various embodiments, various workspace data sources 120 may have different data fields. For example, one platform has concepts of user, userGroup, and role so data fields are mapped as is in the data objects 240 of the data management server 130. The permission information maintained by a workspace data source 120 can be captured from sys_security_acl_role and sys_security_acl table and represented as accessTo edges directed to resources.

Figure 7:
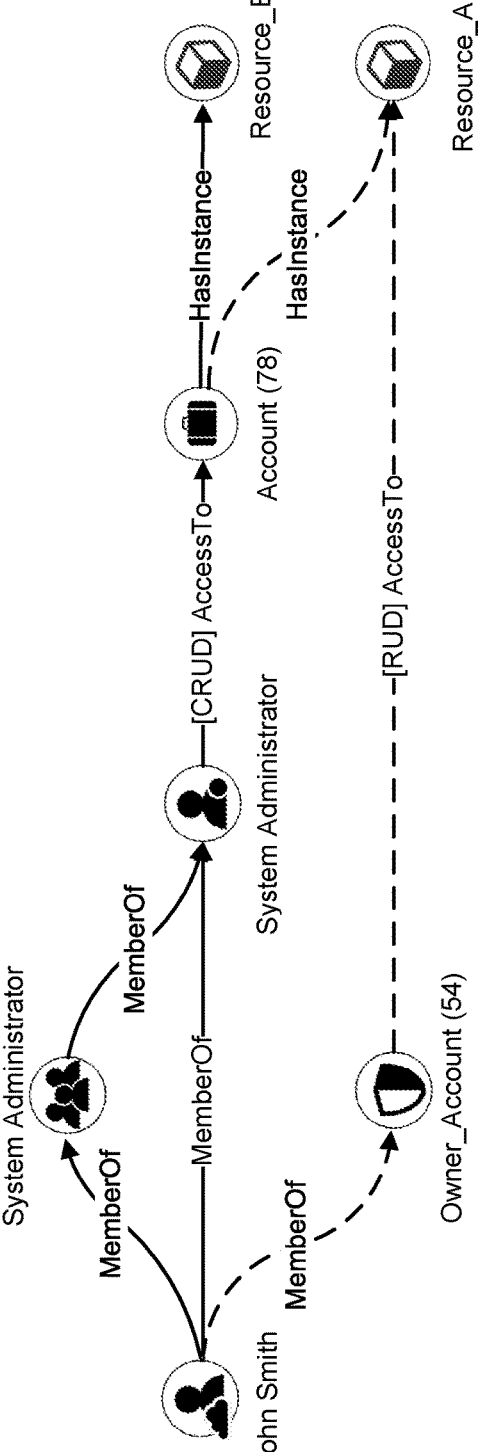
FIG. 7 is an example of a graphical user interface showing a rendered access graph, in accordance with some embodiments.
Figure 8:
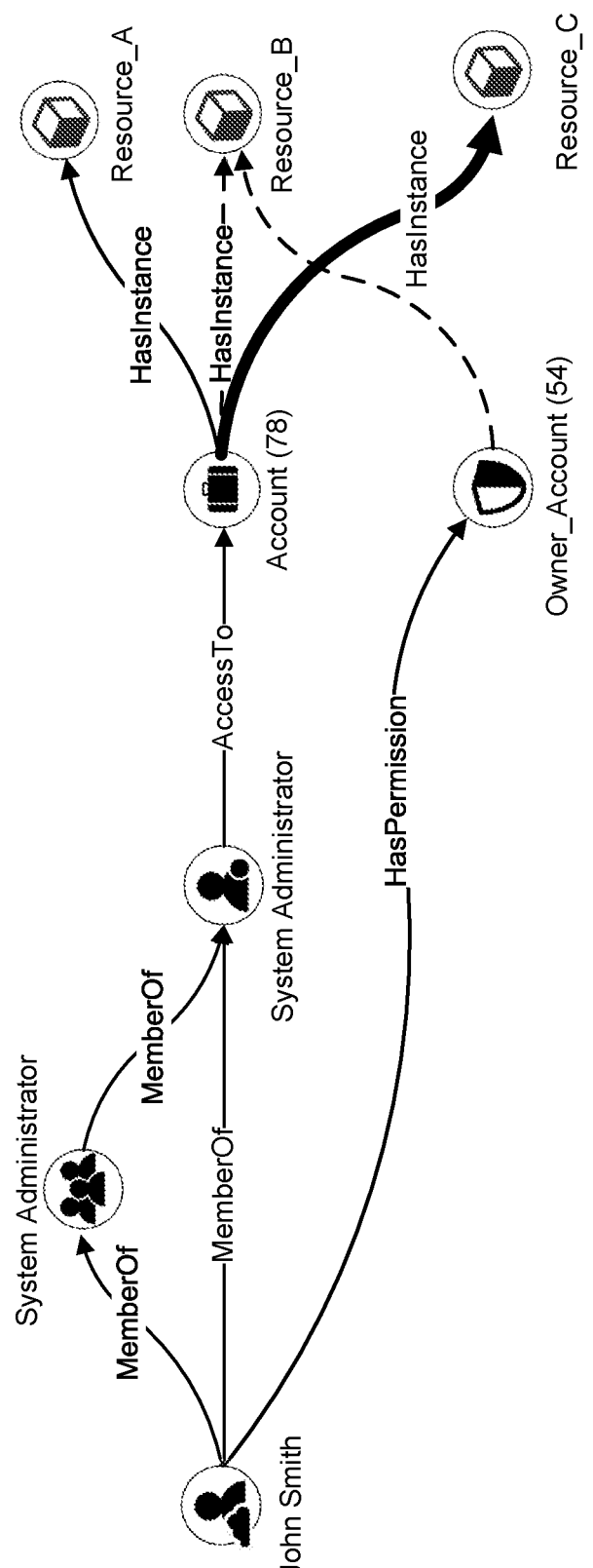
FIG. 8 is an example of a graphical user interface showing a rendered access graph, in accordance with some embodiments.
Figure 9:
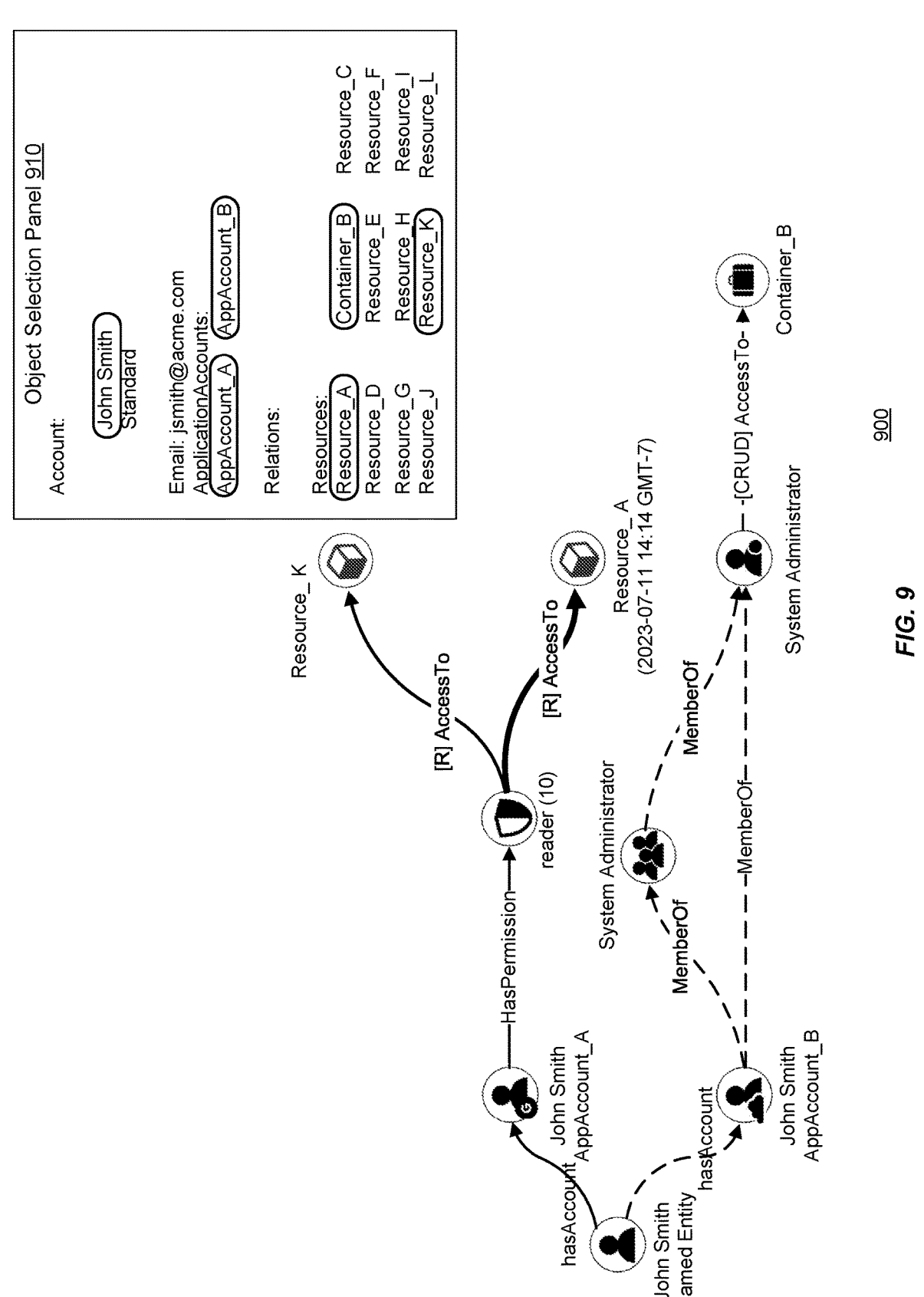
FIG. 9 is an example of a graphical user interface showing a rendered access graph, in accordance with some embodiments.

In various embodiments, the access graphs may include various features. FIG. 7 through FIG. 9 illustrate various examples of graphical user interfaces showing event graphs, in accordance with some embodiments.

The data management server 130 may provide a permission utilization analysis. Graph edges that were potentially used may be specifically marked based on data event logs. Displaying the utilization of access-graph paths as the thickness of edges in the graph provides an illustration in the form of weighted graphs where the weight of every edge represents the number of times that edge was exercised in the access event. FIG. 8 is an example of an access graph with varying thicknesses that are commensurate with the level of activities of an individual performing actions with data.

The data management server 130 may determine dormant members of a group or a role from activity events in the access graph. With events mapped in the access-graph data model, the data management server 130 may determine which users are never exercising permissions enabled by their specific role or group membership. The data management server 130 may use events mapped to access the graph and determine which "memberof" edges (or another type of edge) are never exercised in the access graph. FIG. 7 is an example of an access graph that shows that John Smith is a member of a certain owner account (54) and the dashed line indicates that the records show that John Smith does not access the owner account the resource_A.

The data management server 130 may display the access graph for selected events on the activity analysis page. With events mapped in an access-graph data model, the data management server 130 may build features where the access graph can be displayed while users are reviewing the activities. When an end user selects one or more events in a table (not shown in figures), the data management server 130 may retrieve the access path for those events and show the events in the same spot where the activity frequency chart is shown in another tab in a panel. For example, FIG. 7 and FIG. 9 show that various access graphs may be displayed based on the selection or filtering of criteria such as relations, resources, accounts, etc. The user of the access graph may select one or more criteria in the selection panel, and corresponding access graphs are generated.

For example, FIG. 9 illustrates an example graphical user interface 900 provided by the data management server 130, in accordance with some embodiments. The graphical user interface 900 may include an object selection panel 910 for users to select one or more nodes and/or edges. Based on the user selection, the data management server 130 retrieves relevant nodes, including both end nodes and intermediate nodes, and renders the access graph based on the selection. At the moment presented in FIG. 9, the user has selected the identity John Smith that represents the named entity John Smith, and also selected Resource_A, Container_B, and Resource_K. In return, relevant access paths and intermediate nodes are rendered in the access paths, such as the two application accounts that are associated with the named entity John Smith. If the user de-selects one of the application accounts, the corresponding access path will disappear from the access graph. Similarly, if the user selects additional nodes such as an additional resource node, the access paths related to the selected additional node will be added to the access graph in the graphical user interface 900.

The data management server 130 may also determine the utilization ratio of different groups and role membership per user basis. With events mapped in an access-graph data model, the data management server 130 can determine the split of the utilization of permissions per user basis. For example, in accessTo permission, if three users accessed a data resource, the data management server 130 can find "accessTo" edge utilization split usage to determine who accessed more frequently and who are rare users.

The data management server 130 may also display a time series of events per Account, Group, Role, Resource, or edges "memberOf" or "accessTo." With events mapped in the access-graph data model, the data management server 130 may determine an access path for each event with a timestamp. This can be used to build the timeseries for individual nodes or edges to determine the time series of all activities performed through that node or edge.

Example Sequence Diagrams

Figure 10:
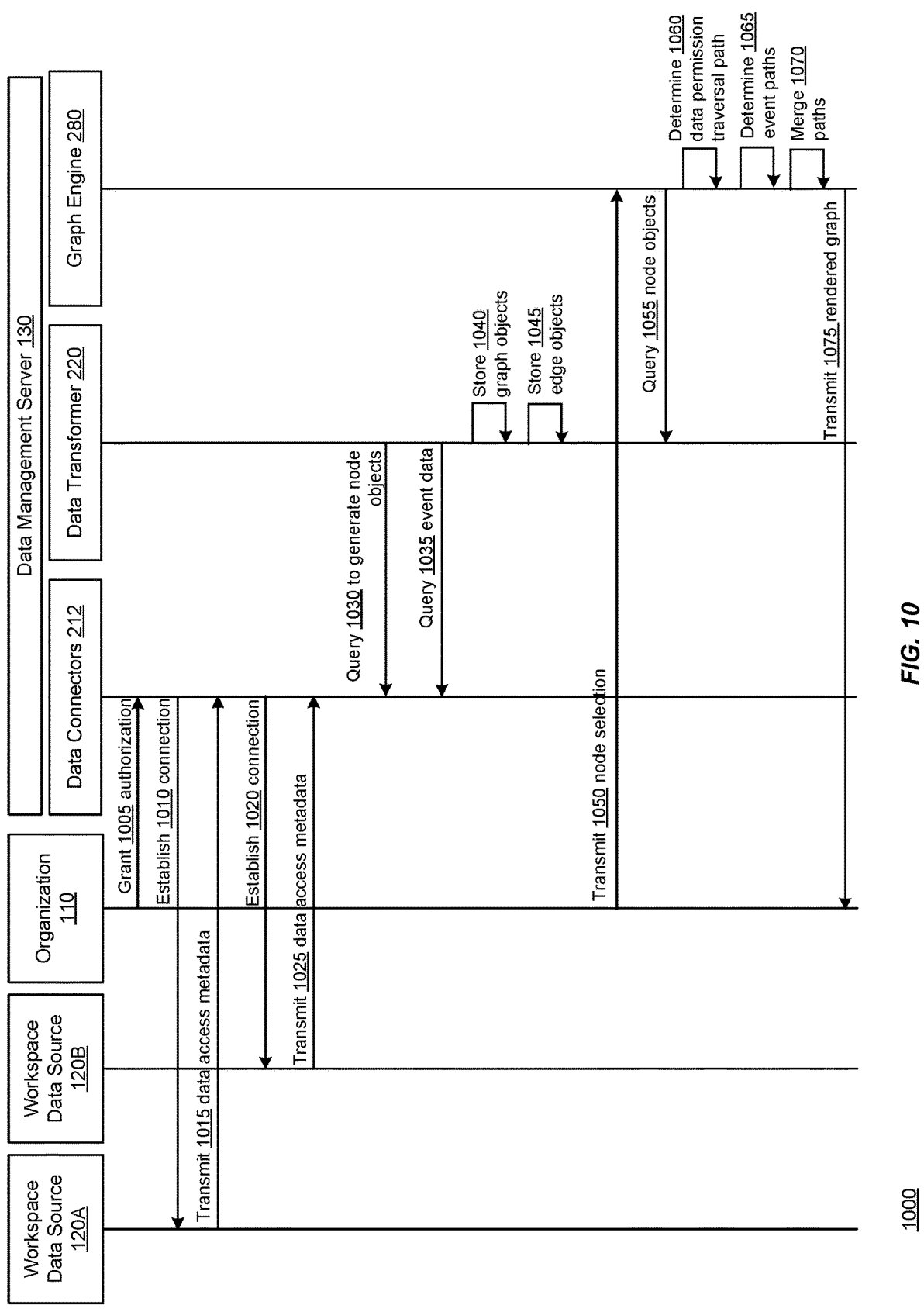
FIG. 10 is an example sequence diagram illustrating an example series to render an access graph, in accordance with some embodiments.

FIG. 10 is an example sequence diagram illustrating an example series 1000 of interactions among components of the system environment 100 to render an access graph, in accordance with some embodiments. The series 1000 illustrated in FIG. 10 represents sets of instructions that may be stored in one or more computer-readable media, such as the memory of different servers. The instructions, when executed by one or more processors of the depicted entities, cause one or more processors to perform the described interactions. As depicted in FIG. 10, the series 1000 may involve the organization 110, a first workspace data source 120A, a second workspace data source 120B, and the data management server 130. The data management server 130 may include sub-components that are used to perform the series 1000, such as the data connectors 212, the data transformer 220, and the graph engine 280. For simplicity, the data connectors 212 and the data transformer 220 in FIG. 10 may include the associated data stores. For example, the data connector 212 may include the raw data store 214 and the data transformer 220 may include the data store 242. Those sub-components are merely examples that are used to illustrate some functionalities of the data management server 130. In various embodiments, the data management server 130 may not contain the precise components shown in the series 1000 and the functionalities may be distributed differently than the example shown in the series 1000. Also, while the series 1000 is illustrated as a sequence of steps, each step in the series 1000 may not follow the precise order as illustrated in FIG. 10. One or more steps may also be added, omitted, changed, or merged in various embodiments.

The first workspace data source 120A and the second workspace data source 120B are examples of access control systems that are delegated by a domain (organization 110) to control data access of the organization 110 and maintain data access history associated with the organization 110. For example, the first workspace data source 120A and the second workspace data source 120B are two SaaS platforms that provide services to the organization 110. The data managed by the SaaS platforms are part of the data of the organization 110.

An organization 110 may grant 1005 authorization to the data management server 130 to receive data of the organization 110 from the first workspace data source 120A and the second workspace data source 120B. The data connectors 212 may receive the grant of permission from the organization 110 to receive data from the organization 110. Each data connector 212 may establish an API channel respectively with the first workspace data source 120A and the second workspace data source 120B.

For example, a data connector 212 may establish 1010 connection with the first workspace data source 120A. In turn, the first workspace data source 120A transmits 1015 a first set of data access metadata to the data connector 212. Likewise, another data connector 212 may establish 1020 connection with the second workspace data source 120B. In turn, the second workspace data source 120B transmits 1025 a second set of data access metadata to the data connector 212. The two sets of metadata are heterogeneous and may include different data fields and may be in different formats.

The data connectors 212 receive heterogeneous sets of metadata related to the data access history. For example, a first data connector 212 may receive a first set of metadata arranged in the first format via a first API channel from the workspace data source 120. A second data connector 212 may receive a second set of metadata arranged in the second format via a second API channel from the workspace data source 120. The data connectors 212 may store the first set of metadata and the second set of metadata in a common file format, such as in the CSV format.

The data transformer 220 may query 1030 the raw data store associated with the data connectors 212 to generate node objects. The queries may be performed to both sets of metadata to generate standardized data objects according to a data schema. For example, the data transformer 220 may generate one or more queries of a node type. The query may include attributes of the node type. The data transformer 220 may perform the one or more queries on the heterogeneous sets of metadata. The data transformer 220 may create one or more graph objects based on query results that match the attributes from the heterogeneous sets of metadata. For example, the data transformer 220 may identify a named entity and the application accounts of the named entity that are in different workspace data sources. Those application accounts from different workspace data sources may be stored in the same table as one type of graph object. Other types of graph objects, such as groups, roles, and data resources may also be generated similarly. The data transformer 220 may store the one or more graph objects that are generated from the metadata in a data collection. The data collection may be a table that represents the node type and the table may include the node objects that belong to the same type.

The data transformer 220 may also query 1035 event data to generate a plurality of event objects. An event may be related to a data access event and associated with a data resource and an application account.

The data transformer 220 may store 1040 graph objects generated from the heterogeneous sets of metadata. The graph objects may include various types of nodes, such as application account nodes representing application accounts associated with the domain, and resource nodes representing data resources associated with the domain. The data transformer 220 may also store a plurality of event objects representing instances of events associated with the data resources. The data transformer 220 may also determine the relationships between nodes and store 1045 various edge objects.

The organization 110 may transmit 1050 selection. For example, the graph engine 280 may receive a selection of one or more graph objects as a source node and a destination node. The destination node may be associated with a particular data resource associated with the organization 110. For example, a user of the organization 110 may intend to review the access history of a particular data instance that resides in one of the workspace data sources.

The graph engine 280 may query 1055 the node objects. The graph engine 280 may determine 1060 a data permission traversal path between a source node and a destination node. The graph engine 280 may determine 1065 the event paths between the source node and the destination node. The event paths and the data permission traversal path before merging are illustrated in FIG. 5. The graph engine 280 may merge 1070 the data permission traversal path and the event paths and aggregate the event paths. For example, FIG. 8 illustrates that the application account John Smith has a data permission traversal path to Account (78) and in turn has access to Resource_A, Resource_B, and Resource_C. There can be a large number of event paths associated with the Resource_C so that the merged path is shown as a thick line. There can be no event path associated with Resource_B so that the merged path is shown as a dashed line. In FIG. 9, the reader account (10) has access permission and event paths to both resource_K and Resource_A. Resource_A has a larger number of event paths and the merged path is shown as a thicker line.

The graph engine 280 may render for display, at a graphical user interface, a data access graph that illustrates the data permission traversal path from the source node to the particular data resource. The data permission traversal path may include an application account node representing a particular application account of the domain. The data permission traversal path may also include a resource node representing the particular data resource. The data permission traversal path may further include a graphical representation of the data permission traversal path representing the particular application account having permission to access the particular data resource. The graphical representation in FIG. 8 and FIG. 9 is an edge that has varying thickness. At least a portion of the graphical representation of the data permission traversal path is rendered according to the data access activity level of the particular application account accessing the particular data resource. The data access activity level is aggregated from the event objects representing the events of the particular application account accessing the particular data resource. For example, the access activity level is aggregated from the number of event paths.

The graph engine 280 may transmit 1075 the rendered access graph to the organization 110 for display.

Figure 11:
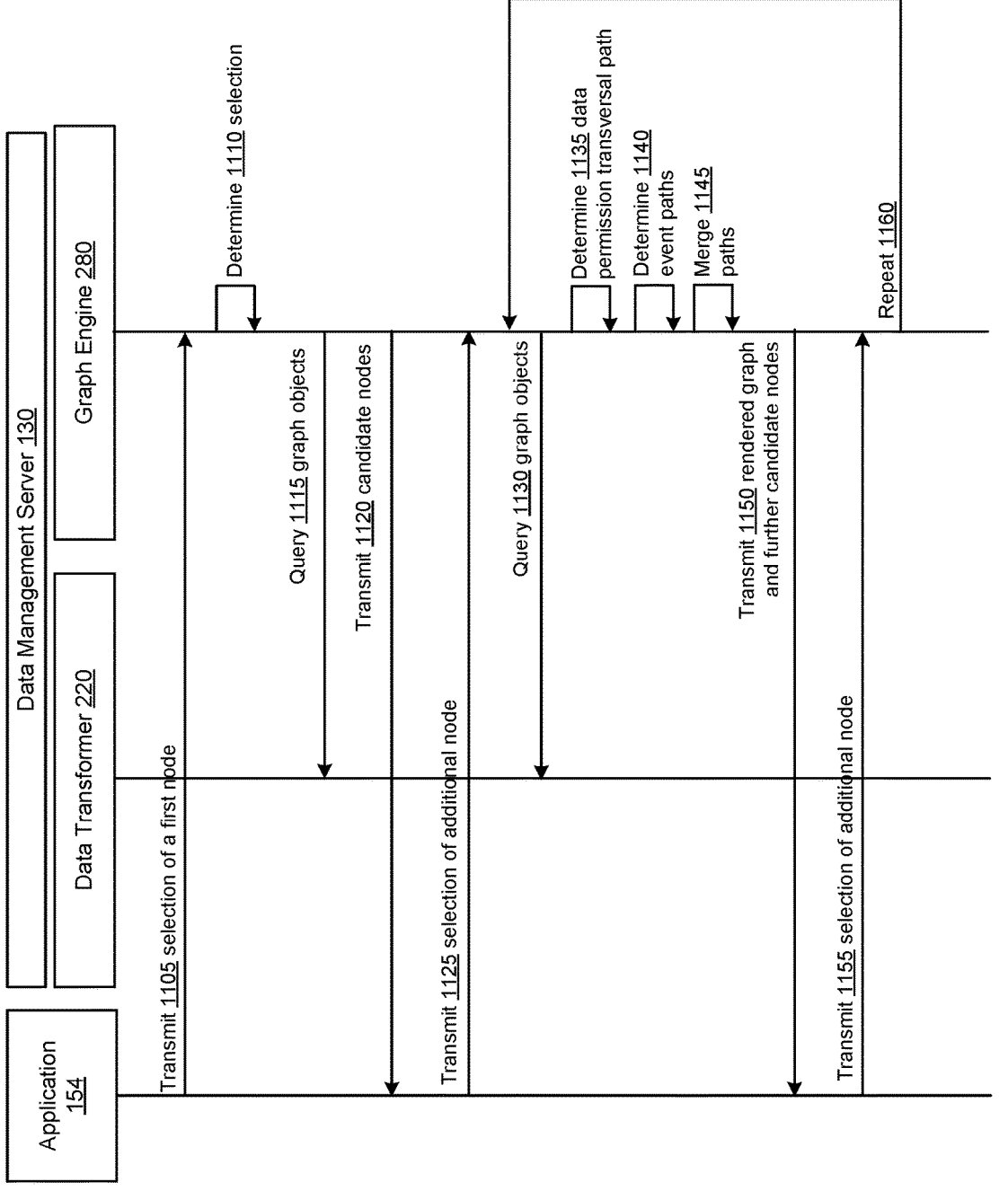
FIG. 11 is an example sequence diagram illustrating an example series for expanding an access graph, in accordance with some embodiments.

FIG. 11 is an example sequence diagram illustrating an example series 1100 of interactions for expanding an access graph, in accordance with some embodiments. The series 1100 illustrated in FIG. 11 represents sets of instructions that may be stored in one or more computer-readable media, such as the memory of different servers. The instructions, when executed by one or more processors of the depicted entities, cause one or more processors to perform the described interactions. As depicted in FIG. 11, the series 1100 may involve an application 154 and the data management server 130. The application 154 may be a front-end application provided by data management server 130 such as a data management SaaS platform for use by a data administrator of an organization 110. The data management server 130 may include sub-components that are used to perform the series 1100, such as the data transformer 220 and the graph engine 280. For simplicity, the data transformer 220 in FIG. 11 may include the associated data stores. For example, the data transformer 220 may include the data store 242. Those sub-components are merely examples that are used to illustrate some functionalities of the data management server 130. In various embodiments, the data management server 130 may not contain the precise components shown in the series 1100 and the functionalities may be distributed differently than the example shown in the series 1100. Also, while the series 1100 is illustrated as a sequence of steps, each step in the series 1100 may not follow the precise order as illustrated in FIG. 11. One or more steps may also be added, omitted, changed, or merged in various embodiments.

The application 154 may transmit 1105 a selection of a first node. For example, a data administrator may be interested in reviewing the data access profile of a named entity, and therefore selecting an identity node associated with the named entity. In another case, a data administrator may be interested in the access history of a particular data resource, and therefore selecting a data resource from a list of data resources.

The graph engine 280 determines 1110 the selection of the first node to identify the nature of the selection. For example, the graph engine 280 may determine whether the selection is towards an application account or a data resource. In turn, the graph engine 280 may query 1115 for graph objects that are related to the selected node. For example, if the selected node is an account, the graph engine 280 may query the data transformer 220 to determine what the groups, roles, and application accounts are connected to the selected account. If the selected node is a data resource, the graph engine 280 may query the data transformer 220 to determine what roles and application accounts are connected to the data resource.

The graph engine 280 may transmit 1120 candidate nodes to the application 154. For example, the candidate nodes may be displayed in the object selection panel 910 in FIG. 9. The application 154 may transmit 1125 a selection of one or more additional nodes. Some selected nodes are illustrated in FIG. 9.

The graph engine 280 may query 1130 the data transformer 220 for additional graph objects, such as any intermediate nodes related to the selected nodes. The graph engine 280 may determine 1135 a data permission traversal path between a source node and a destination node. The graph engine 280 may determine 1140 the event paths between the source node and the destination node. The graph engine 280 may merge 1145 the data permission traversal path and the event paths and aggregate the event paths. These steps are similar to steps 1060 through 1070 discussed in FIG. 10.

The graph engine 280 may transmit 1150 the rendered access graph to application 154 and display further candidate nodes as the access graph is built and expanded. The further candidate nodes may be shown in the object selection panel 910. The application 154 may transmit 1155 a selection of one or more additional nodes. In turn, the graph engine 280 repeats 1160 the access graph building process and adds more paths to the access graph. For example, in FIG. 9, originally the access graph may only include the top branch associated with the application account A. The user may select to add application account B. In turn, the bottom branch associated with the application account B is added. The process may be an iterative process to continue to add further paths to the access graph.

Computing Machine Architecture

Figure 12:
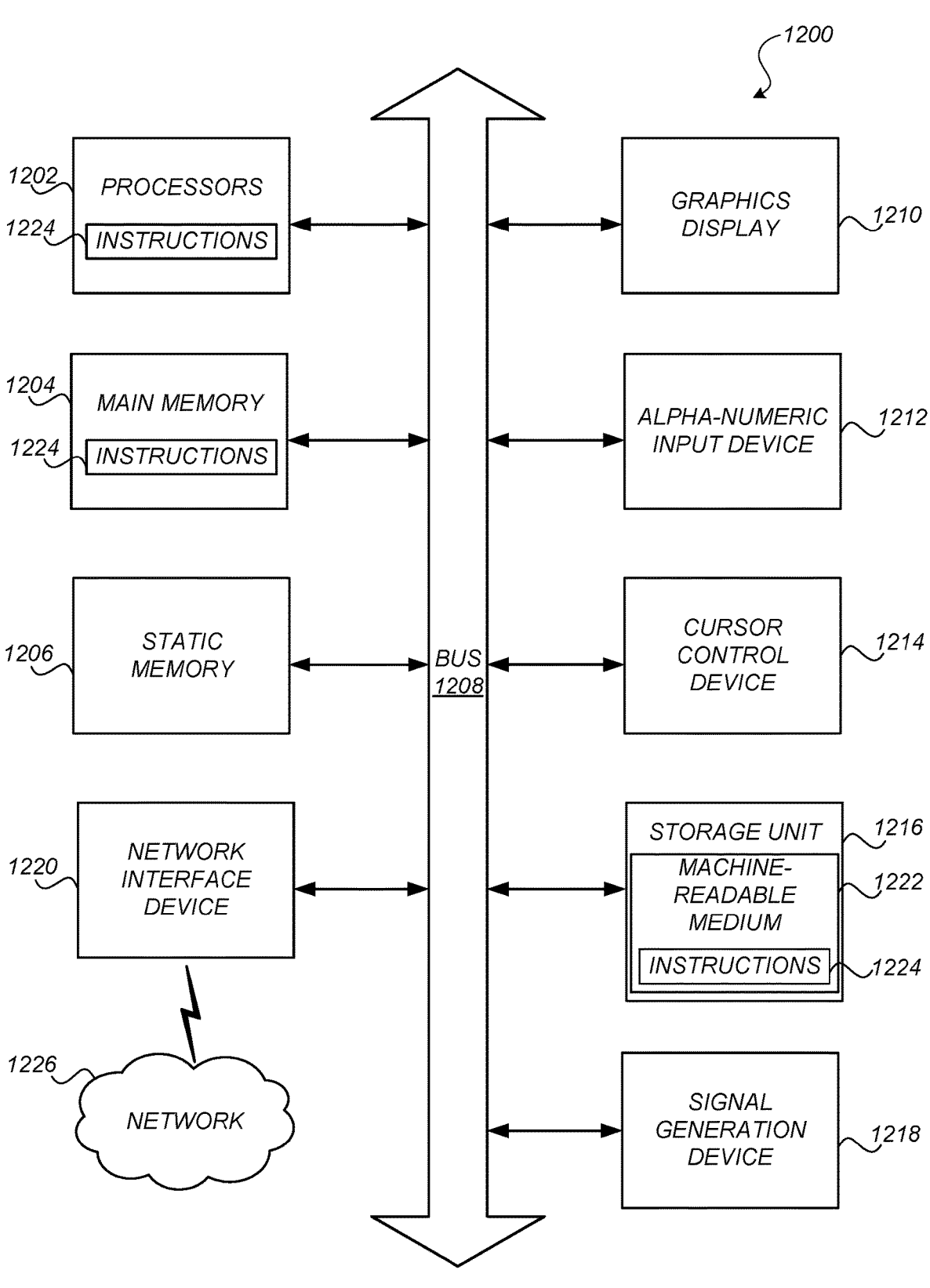
FIG. 12 is a block diagram illustrating components of an example computing machine, in accordance with some embodiments.

FIG. 12 is a block diagram illustrating components of an example computing machine that is capable of reading instructions from a computer-readable medium and executing them in a processor (or controller). A computer described herein may include a single computing machine shown in FIG. 12, a virtual machine, a distributed computing system that includes multiple nodes of computing machines shown in FIG. 12, or any other suitable arrangement of computing devices.

By way of example, FIG. 12 shows a diagrammatic representation of a computing machine in the example form of a computer system 1200 within which instructions 1224 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 12 may correspond to any software, hardware, or combined components shown in FIGS. 1 and 2. While FIG. 12 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1224 that specify actions to be taken by that machine. Further, while only a single machine is illustrated, the terms "machine" and "computer" may also be taken to include any collection of machines that individually or jointly execute instructions 1224 to perform any one or more of the methodologies discussed herein.

The example computer system 1200 includes one or more processors 1202 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1200 may also include a memory 1204 that stores computer code including instructions 1224 that may cause the processors 1202 to perform certain actions when the instructions are executed, directly or indirectly by the processors 1202. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 1202 and reduce the space required for the memory 1204. For example, the database processing techniques described herein reduce the complexity of the computation of the processor 1202 by applying one or more novel techniques that simplify the steps in training, reaching convergence, and generating results of the processors 1202. The algorithms described herein also reduce the size of the models and datasets to reduce the storage space requirement for memory 1204.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause a processor (including in situation of one or more processors) to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 1200 may include a main memory 1204, and a static memory 1206, which are configured to communicate with each other via a bus 1208. The computer system 1200 may further include a graphics display unit 1210 (e.g., a plasma display panel (PDP), a liquid crystal display (LCD), a projector, or a cathode ray tube (CRT)). The graphics display unit 1210, controlled by the processor 1202, displays a graphical user interface (GUI) to display one or more results and data generated by the processes described herein. The computer system 1200 may also include an alphanumeric input device 1212 (e.g., a keyboard), a cursor control device 1214 (e.g., a mouse, a trackball, a joystick, a motion sensor, or other pointing instruments), a storage unit 1216 (a hard drive, a solid-state drive, a hybrid drive, a memory disk, etc.), a signal generation device 1218 (e.g., a speaker), and a network interface device 1220, which also are configured to communicate via the bus 1208.

The storage unit 1216 includes a computer-readable medium 1222 on which is stored instructions 1224 embodying any one or more of the methodologies or functions described herein. The instructions 1224 may also reside, completely or at least partially, within the main memory 1204 or within the processor 1202 (e.g., within a processor's cache memory) during execution thereof by the computer system 1200, the main memory 1204 and the processor 1202 also constituting computer-readable media. The instructions 1224 may be transmitted or received over a network 1226 via the network interface device 1220.

While computer-readable medium 1222 is shown in an example embodiment to be a single medium, the term "computer-readable medium" should be taken to include a single medium or multiple media (e.g., a centralized or distributed database, or associated caches and servers) able to store instructions (e.g., instructions 1224). The computer-readable medium may include any medium that is capable of storing instructions (e.g., instructions 1224) for execution by the processors (e.g., processors 1202) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
   a plurality of data connectors configured to establish connections with a plurality of access control systems and receive heterogeneous sets of metadata related to data access history, the access control systems delegated by a domain to control data access of the domain and maintain data access history associated with the domain;
   a transformer comprising a first program code, the program code comprising instructions that when executed cause a processor to store graph objects in a memory, the graph objects generated from the heterogeneous sets of metadata, the graph objects comprise:

application account nodes representing application accounts associated with the domain, and resource nodes representing data resources associated with the domain;

the memory further configured to store a plurality of event objects representing instances of events associated with the data resources; and an application comprising a second program code configured to:

receive a selection of one or more graph objects as a source node and a destination node, the destination node associated with a particular data resource associated with the domain; and provide for rendering on a display, a graphical user interface having a data access graph that illustrates a data permission traversal path from the source node to the particular data resource, the data permission traversal path comprises (1) an application account node representing a particular application account of the domain, (2) a resource node represented the particular data resource, and (3) a graphical representation of the data permission traversal path representing the particular application account having permission to access the particular data resource, at least a portion of the graphical representation of the data permission traversal path provided to render according to a data access activity level of the particular application account accessing the particular data resource, and the data access activity level aggregated from the event objects representing the events of the particular application account accessing the particular data resource, wherein the graphical user interface comprises a first panel that displays the data access graph and a second panel that display suggestions of nodes to be added to graph, and the data access graph is expandable through a user selecting additional nodes.

2. The system of claim 1, wherein the graph objects are generated according to a data schema, the data schema comprises:

an application account node type, wherein the application accounts from different access control systems are classified to the account node type;

a data resource node type, wherein the data resources from different access control systems are classified to the data resource node type;

an event node type, wherein a plurality of data events from different access control systems are classified to the data resource node type; and an edge type, wherein an edge identifies a connection between two nodes in the data schema.

3. The system of claim 2, wherein the data schema comprises a plurality of different node types, each being associated with a set of attributes, and a plurality of different edge types, each edge type describing a different relationship between two nodes.

4. The system of claim 1, wherein instructions to store the graph objects further comprise instructions to cause the processor to:

generate one or more queries of a node type, the queries comprising attributes of the node type;

perform the one or more queries on the heterogeneous sets of metadata obtained from the plurality of access control systems;

create one or more graph objects based on query results that match the attributes from the heterogeneous sets of metadata; and store the one or more graph objects that are generated from the metadata of the plurality of access control systems in a data collection, the data collection representing the node type.

5. The system of claim 1, wherein the graph objects are standardized across the heterogeneous sets of metadata obtained from the plurality of access control systems.

6. A system comprising:

one or more processors; and a memory storing code comprising instructions, wherein the instructions when executed by one or more processors cause the one or more processors to:

establish connections with a plurality of access control systems, the access control systems delegated by a domain to control data access of the domain and maintain data access history associated with the domain;

receive, from the plurality of access control systems, heterogeneous sets of metadata related to the data access history;

store graph objects generated from the heterogeneous sets of metadata, the graph objects comprise:

application account nodes representing application accounts associated with the domain, and resource nodes representing data resources associated with the domain;

store a plurality of event objects representing instances of events associated with the data resources;

receive a selection of one or more graph objects as a source node and a destination node, the destination node associated with a particular data resource associated with the domain; and provide, to render for display in a graphical user interface, a data access graph that illustrates a data permission traversal path from the source node to the particular data resource, the data permission traversal path comprising (1) an application account node representing a particular application account of the domain, (2) a resource node represented the particular data resource, and (3) a graphical representation of the data permission traversal path representing the particular application account having permission to access the particular data resource, at least a portion of the graphical representation of the data permission traversal path is rendered according to a data access activity level of the particular application account accessing the particular data resource, and the data access activity level aggregated from the event objects representing the events of the particular application account accessing the particular data resource, wherein the graphical user interface comprises a first panel that displays the data access graph and a second panel that display suggestions of nodes to be added to graph, and the data access graph is expandable through a user selecting additional nodes.

7. The system of claim 6, wherein the instructions to establish the connections to the plurality of access control systems comprise instructions that cause the one or more processors to:

receive a grant of permission from the domain to receive data of the domain from a software as a service (SaaS) platform, the SaaS platform being one of the access control systems; and establish an application programming interface (API) channel with the SaaS platform.

8. The system of claim 6, wherein the instructions to receive, from the plurality of access control systems, heterogeneous sets of metadata related to the data access history further comprise instructions that cause the one or more processors to:

receive a first set of metadata arranged in a first format via a first API channel from a first access control system;

receive a second set of metadata arranged in a second format via a second API channel from a second access control system, wherein the second set of metadata contains different fields than the first set of metadata; and store the first set of metadata and the second set of metadata in a common file format.

9. The system of claim 6, wherein the graph objects are generated according to a data schema, the data schema comprises:

an application account node type, wherein the application accounts from different access control systems are classified to the account node type;

a data resource node type, wherein the data resources from different access control systems are classified to the data resource node type;

an event node type, wherein a plurality of data events from different access control systems are classified to the data resource node type; and an edge type, wherein an edge identifies a connection between two nodes in the data schema.

10. The system of claim 9, wherein the data schema comprises a plurality of different node types, each being associated with a set of attributes, and a plurality of different edge types, each edge type describing a different relationship between two nodes.

11. The system of claim 6, wherein instructions to store the graph objects further comprise instructions that cause the one or more processors to:

generate one or more queries of a node type, the queries comprising attributes of the node type;

perform the one or more queries on the heterogeneous sets of metadata obtained from the plurality of access control systems;

create one or more graph objects based on query results that match the attributes from the heterogeneous sets of metadata; and store the one or more graph objects that are generated from the metadata of the plurality of access control systems in a data collection, the data collection representing the node type.

12. The system of claim 6, wherein the graph objects are standardized across the heterogeneous sets of metadata obtained from the plurality of access control systems.

13. The system of claim 6, wherein the data access graph is generated by connecting the source node and the destination node through a graph algorithm.

14. The system of claim 6, wherein the portion of the graphical representation of the data permission traversal path comprises an edge whose thickness is commensurate with the data access activity level.

15. A computer-implemented method, comprising:

establishing connections with a plurality of access control systems, the access control systems delegated by a domain to control data access of the domain and maintain data access history associated with the domain;

receiving, from the plurality of access control systems, heterogeneous sets of metadata related to the data access history;

storing graph objects generated from the heterogeneous sets of metadata, the graph objects comprising:

application account nodes representing application accounts associated with the domain, and resource nodes representing data resources associated with the domain;

storing a plurality of event objects representing instances of events associated with the data resources;

receiving a selection of one or more graph objects as a source node and a destination node, the destination node associated with a particular data resource associated with the domain; and providing to render for display through a graphical user interface a data access graph that illustrates a data permission traversal path from the source node to the particular data resource, the data permission traversal path comprising (1) an application account node representing a particular application account of the domain, (2) a resource node represented the particular data resource, and (3) a graphical representation of the data permission traversal path representing the particular application account having permission to access the particular data resource, at least a portion of the graphical representation of the data permission traversal path rendered according to a data access activity level of the particular application account accessing the particular data resource, and the data access activity level aggregated from the event objects representing the events of the particular application account accessing the particular data resource, wherein the graphical user interface comprises a first panel that displays the data access graph and a second panel that display suggestions of nodes to be added to graph, and the data access graph is expandable through a user selecting additional nodes.

16. The method of claim 15, wherein the graph objects are generated according to a data schema, the data schema comprises:

an application account node type, wherein the application accounts from different access control systems are classified to the account node type;

a data resource node type, wherein the data resources from different access control systems are classified to the data resource node type;

an event node type, wherein a plurality of data events from different access control systems are classified to the data resource node type; and an edge type, wherein an edge identifies a connection between two nodes in the data schema.

17. The method of claim 16, wherein the data schema comprises a plurality of different node types, each being associated with a set of attributes, and a plurality of different edge types, each edge type describing a different relationship between two nodes.

18. The method of claim 15, wherein storing the graph objects comprises:

generating one or more queries of a node type, the queries comprising attributes of the node type;

performing the one or more queries on the heterogeneous sets of metadata obtained from the plurality of access control systems;

creating one or more graph objects based on query results that match the attributes from the heterogeneous sets of metadata; and storing the one or more graph objects that are generated from the metadata of the plurality of access control systems in a data collection, the data collection representing the node type.

* * * * *